(12) United States Patent
Ugusa et al.

(10) Patent No.: US 6,728,604 B2
(45) Date of Patent: Apr. 27, 2004

(54) COLLISION TYPE DECISION DEVICE

(75) Inventors: Aki Ugusa, Tokyo (JP); Toshiyuki Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 91 days.

(21) Appl. No.: 10/119,717

(22) Filed: Apr. 11, 2002

(65) Prior Publication Data

US 2003/0074111 A1 Apr. 17, 2003

(30) Foreign Application Priority Data

Oct. 16, 2001 (JP) .......................... 2001-318395

(51) Int. Cl.[7] .......................... B60R 21/02; B60R 21/32
(52) U.S. Cl. .................. 701/1; 701/46; 701/47; 280/735; 340/436
(58) Field of Search ................... 701/1, 45, 46, 701/47, 96; 280/735; 180/282; 340/436

(56) References Cited

U.S. PATENT DOCUMENTS 6,199,903 B1 * 3/2001 Brambilla et al. .......... 280/735
6,347,268 B1 * 2/2002 Fujita et al. .................. 701/45
6,371,515 B1 * 4/2002 Fujishima et al. .......... 280/735
6,581,962 B2 * 6/2003 Miyata et al. .............. 280/735

FOREIGN PATENT DOCUMENTS

| DE | 100 44 918 A1 | 3/2002 |
| DE | 101 34 331 C1 | 10/2002 |
| JP | 2000-255373 | 9/2000 |
| JP | 2001-30873 | 2/2001 |
| JP | 2001-106021 | 4/2001 |

* cited by examiner

Primary Examiner—Tan Q. Nguyen
(74) Attorney, Agent, or Firm—Sughrue Mion, PLLC

(57) ABSTRACT

A collision type decision device includes left and right deceleration detectors, an arithmetic unit, an average calculating unit, and a decision unit. The left and right deceleration detectors are located at left and right front portions of a vehicle for detecting decelerations at the left and right front portions, respectively. The arithmetic unit calculates the decelerations detected by the deceleration detectors to obtain arithmetic results with respect to the left and right portions of the vehicle. The average calculating unit calculates an average of the arithmetic results. The decision unit compares the average with a threshold and decides whether a collision type of the vehicle is a symmetric or asymmetric on the basis of the comparison.

16 Claims, 17 Drawing Sheets

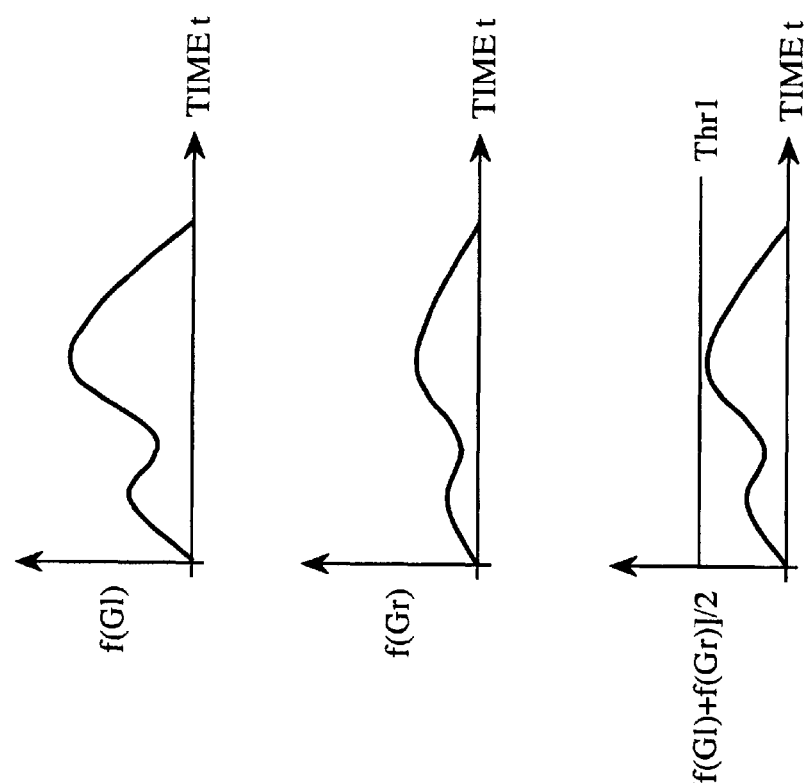
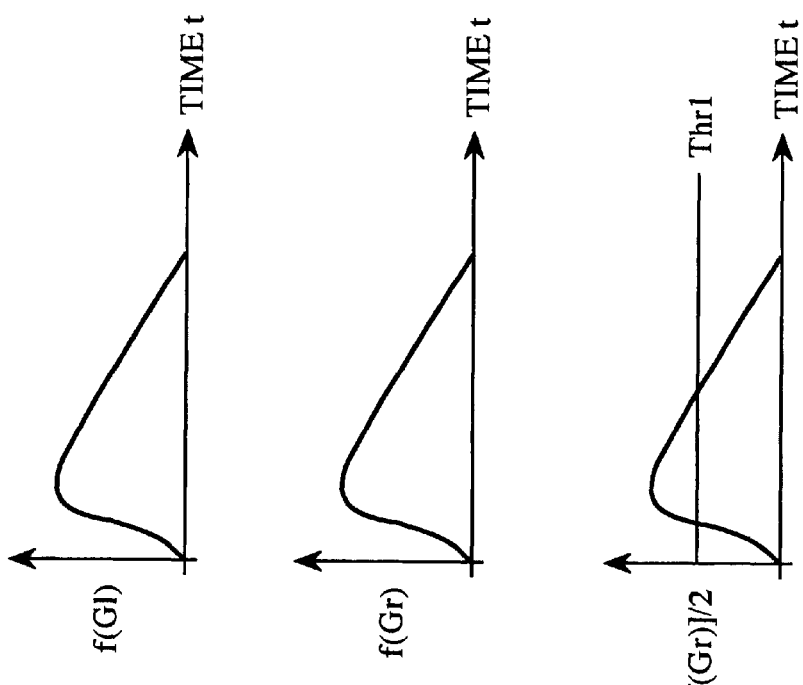

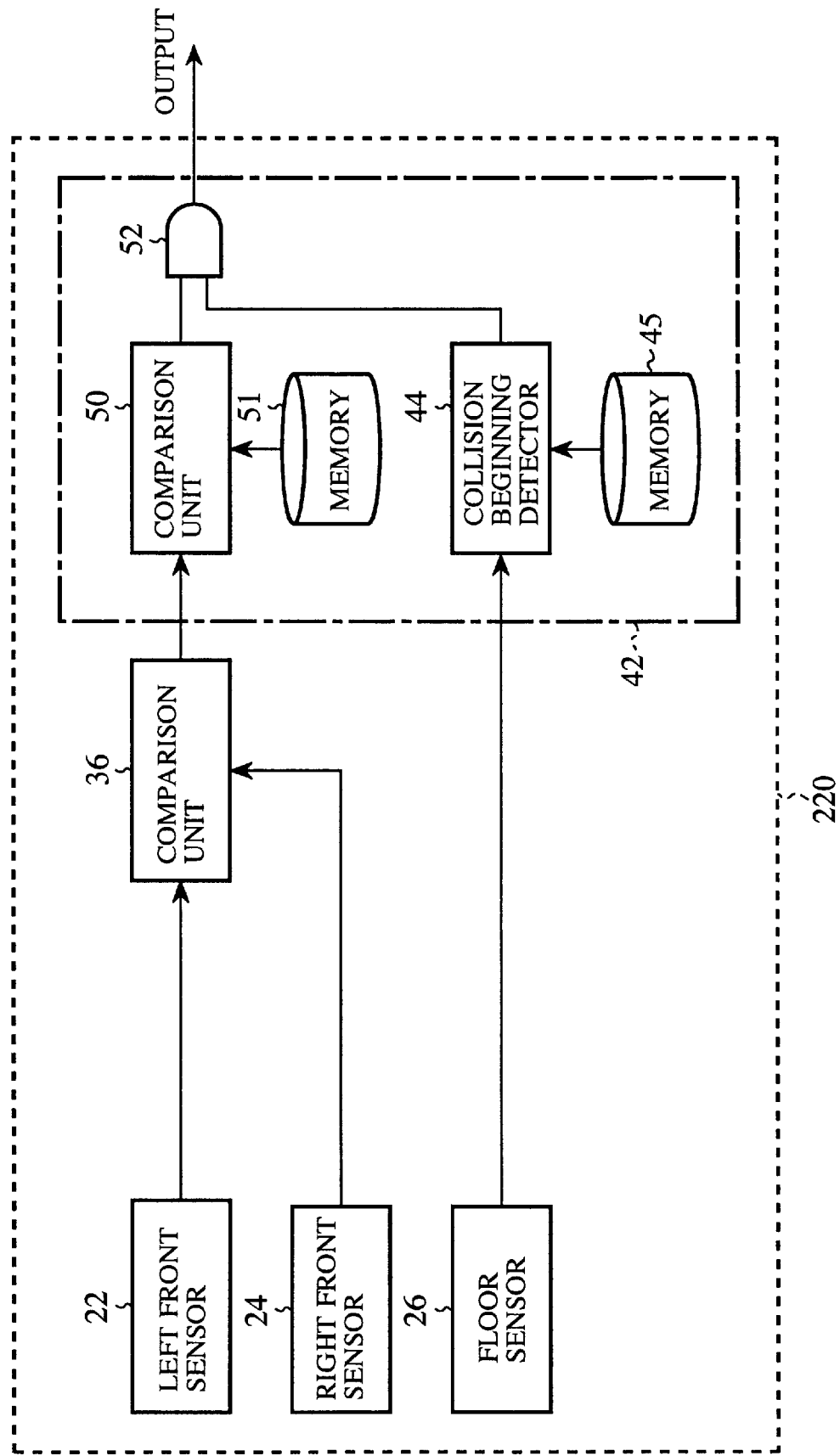

FIG.17A (PRIOR ART)
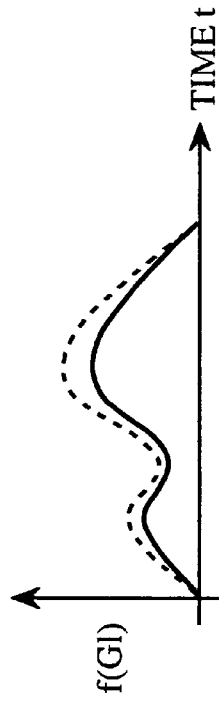
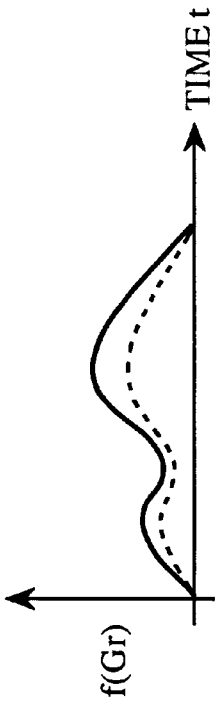
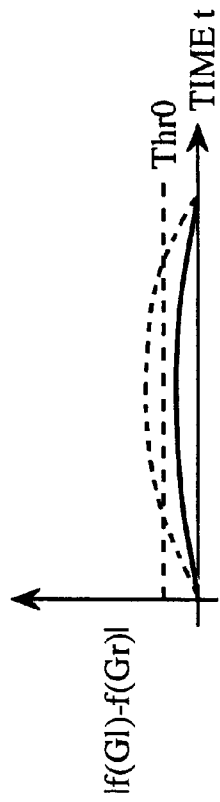
FIG.17B (PRIOR ART)
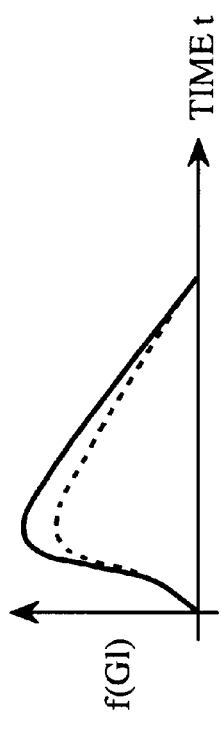
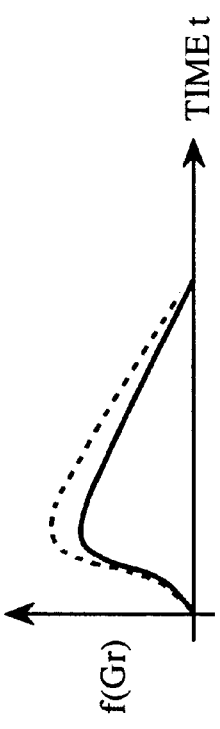
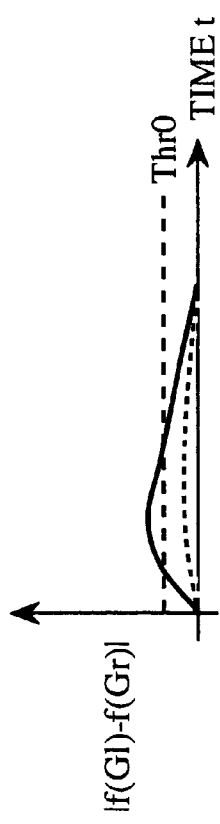

COLLISION TYPE DECISION DEVICE

BACKGROUND OF THE INVENTION

1. Field of the Invention

The present invention relates to a collision type decision device for deciding whether a vehicle has had a head-on (symmetric) collision or an asymmetric collision.

2. Description of the Background Art

A driver/passenger protection apparatus, e.g., air bag, on a vehicle is controlled to activate by a protection activation device. Conventionally, the human protection activation device detects an impact on the vehicle as a deceleration by means of an acceleration sensor, and controls the activation of the human protection apparatus on the basis of the measured deceleration.

There are various collision types including a symmetric (full-wrap) collision where the entire front face of a vehicle is impacted, an asymmetric (offset) collision where a part of the front face of a vehicle is impacted, and a bias collision where a vehicle is impacted by a skewed force having a certain angle. In order to activate a suitable human protection apparatus at more appropriate timing, the use of a collision type decision device has been contemplated.

JP-A-2000-255373 discloses collision type decision devices, each of which decides the collision type by means of acceleration sensors (satellite sensors) situated at the left and right front corners of a vehicle. One of the collision type decision devices disclosed in the publication calculates the respective velocity values of the left and right portions of the vehicle on the basis of the measured decelerations, recognizes the time moments when the respective velocity values exceed a threshold, and decides the collision type on the basis of the time difference between the time moments.

Another collision type decision device disclosed in the publication decides the collision type on the basis of the difference between the left and right velocity values of the vehicle. A still another collision type decision device identifies the time moments when the respective velocity values reach respective peaks and decides the collision type on the basis of the difference between the time moments. These devices utilize a theory that either of the left and right acceleration sensors produces a larger output when an asymmetric collision occurs.

FIG. 16 is a block diagram showing in a simplified form one of collision type decision devices disclosed in JP-A-2000-255373. In FIG. 16, numeral 520 designates a collision type decision device. The collision type decision device 520 includes a left front sensor 22, a right front sensor 24, an arithmetic unit 530, and a comparison unit 540. The sensors 22 and 24 that are disposed left and right front corners of a vehicle, respectively, detect the accelerations (more exactly, decelerations) at the respective positions. The arithmetic unit 530 makes calculations on the outputs of the sensors 22 and 24 to obtain respective arithmetic results with respect to the left and right portions of the vehicle and calculates the difference between the arithmetic results. For example, the arithmetic unit 530 integrates the respective outputs Gl and Gr of the left and right sensors 22 and 24 to obtain the left and right velocities f(Gl) and f(Gr) and calculates the velocity difference |f(Gl)−f(Gr)|. The comparison unit 540 compares the velocity difference |f(Gl)−f(Gr)| with a threshold Thr0 and decides the collision type on the basis of the comparison result.

Conventionally, the left and right front acceleration sensors 22 and 24 are located near the engine room. Accordingly, the temperature change resulting from that in the engine room and other disturbances may affect the acceleration sensors 22 and 24, thereby frequently disenabling the decision device to decide the collision type properly. For example, if either of the left and right acceleration sensors 22 and 24 is significantly affected by the temperature change in comparison with the other sensor although the vehicle has had a symmetric collision, the collision type decision device may improperly decides that an asymmetric collision has occurred.

This problem will be discussed in more detail with reference to FIGS. 17A and 17B. FIG. 17A depicts results at a symmetric collision while FIG. 17B depicts results at an asymmetric collision. In these graphs, dotted lines depict results when no disturbances were applied to the sensors while solid line depict results when some disturbances were applied to the sensors. As will be understood from the dotted lines in FIG. 17A, at the symmetric collision, the velocity difference |f(Gl)−f(Gr)| was always lower than the threshold Thr0. As in FIG. 17B, at the asymmetric collision, the velocity difference |f(Gl)−f(Gr)| exceeded the threshold Thr0 at at least a certain period.

However, as will be understood from the solid lines in FIG. 17A, even at the symmetric collision, when some kind of disturbance was applied, the velocity difference |f(Gl)−f(Gr)| increased farther than that at no disturbance and exceeded the threshold Thr0 for any while. Furthermore, although the same disturbance was applied while the asymmetric collision has occurred, the velocity difference |f(Gl)−f(Gr)| might decrease to be lower than that at no disturbance and be always lower than the threshold Thr0 as will be understood from FIG. 17B. These phenomena make appropriate decisions difficult, so that it is difficult for manufacturers of collision type decision devices to even set the threshold Thr0.

SUMMARY OF THE INVENTION

Accordingly, it is an object of the present invention to provide a collision type decision device for making appropriate decisions of collision type although there are measurement errors of sensors resulting from disturbances.

In accordance with an aspect of the present invention, a collision type decision device includes left and right deceleration detectors, an average calculating unit, and a decision unit. The left and right deceleration detectors are located at left and right front portions of a vehicle for detecting decelerations at the left and right front portions, respectively. The average calculating unit calculates an average of values based on the decelerations detected by the left and right deceleration detectors. The decision unit compares the average with a threshold and decides whether a collision type of the vehicle is a symmetric or asymmetric on the basis of the comparison.

With such a structure, it is possible to make appropriate decisions of collision type although there are measurement errors of deceleration detectors resulting from disturbances.

In an embodiment, the collision type decision device may further include an arithmetic unit for calculating the decelerations detected by the deceleration detectors to obtain arithmetic results with respect to the left and right portions of the vehicle. The average calculating unit may calculate an average of the arithmetic results.

With such a structure, the arithmetic unit may obtain left and right velocities, jerks, and other optional arithmetic results. The collision type decision device can make appropriate decisions of collision type on the basis of such optional arithmetic results.

In another embodiment, the average calculating unit may calculate an average of the decelerations themselves detected by the left and right deceleration detectors.

With such a structure, it is possible to make appropriate decisions of collision type in a more simplified manner.

The collision type decision device may further include a central deceleration detector located near the central portion of the vehicle for detecting deceleration at the central portion, and a collision beginning detector for detecting a collision beginning moment of the vehicle on the basis of the deceleration detected by the central deceleration detector or on the basis of the decelerations detected by the central deceleration detector and at least one of the left and right deceleration detectors. The decision unit may output the decision result thereof for only a certain period after the collision beginning moment.

With such a structure, the device may utilize a great deceleration, which may inherently occur at the initial impact stage after a symmetric collision, as a key, and may discriminate symmetric collisions from asymmetric collisions readily, precisely, and quickly.

In another embodiment, the collision type decision device may further include a central deceleration detector located near the central portion of the vehicle for detecting deceleration at the central portion. The decision unit may compare the threshold with a change in the average calculated by the average calculating unit for a period before a value based on the deceleration at the central portion reaches a certain level, may decide whether a collision type of the vehicle is a symmetric or asymmetric on the basis of the comparison, and may output no decision on the collision type of the vehicle based on the left and right decelerations after the value based on the deceleration at the central portion reaches the certain level.

With such a structure, the device may ignore the peak of the selection result at the posterior impact stage after an asymmetric collision without using a trigger for detecting a collision beginning moment of the vehicle. Therefore, the device may utilize a great deceleration, which may inherently occur at the initial impact stage after a symmetric collision, as a key, and may discriminate symmetric collisions from asymmetric collisions readily, precisely, and quickly.

In this case, the collision type decision device may further include a second arithmetic unit for calculating the deceleration detected by the central deceleration detector to obtain an arithmetic result with respect to the central portion of the vehicle. The decision unit may utilize the arithmetic result with respect to the central portion as the value based on the deceleration at the central portion.

With such a structure, the second arithmetic unit may obtain the central velocity, jerk, and another optional arithmetic result. The collision type decision device can make appropriate decisions of collision type on the basis of such an optional arithmetic result.

In another embodiment, the decision unit may utilize the deceleration itself detected by the central deceleration detector as the value based on the deceleration at the central portion.

With such a structure, it is possible to make appropriate decisions of collision type in a more simplified manner.

The decision unit may output a decision result on the collision type of the vehicle, which is based on the left and right decelerations before the value based on the deceleration at the central portion reaches the certain level, after the value based on the deceleration at the central portion reaches the certain level.

With such a structure, it is possible to freely set an initial condition, such as the threshold for controlling the activation of a driver/passenger protection apparatus, at the initial stage after a collision.

In accordance with another aspect of the present invention, a collision type decision device includes left and right deceleration detectors, a selecting unit, and a decision unit. The left and right deceleration detectors are located at left and right front portions of a vehicle for detecting decelerations at the left and right front portions, respectively. The selecting unit selects a lower value between two values based on the decelerations detected by the left and right deceleration detectors. The decision unit compares a selection result selected by the selecting unit with a threshold and for deciding whether a collision type of the vehicle is a symmetric or asymmetric on the basis of the comparison.

With such a structure, it is possible to make appropriate decisions of collision type although there are measurement errors of deceleration detectors resulting from disturbances.

In an embodiment, the collision type decision device may further include an arithmetic unit for calculating the decelerations detected by the deceleration detectors to obtain arithmetic results with respect to the left and right portions of the vehicle. The selecting unit may select a lower arithmetic result among the arithmetic results.

With such a structure, the arithmetic unit may obtain left and right velocities, jerks, and other optional arithmetic results. The collision type decision device can make appropriate decisions of collision type on the basis of such optional arithmetic results.

In another embodiment, the selecting unit may select a lower deceleration among the decelerations themselves detected by the deceleration detectors.

With such a structure, it is possible to make appropriate decisions of collision type in a more simplified manner.

In an embodiment, the collision type decision device may further include a central deceleration detector located near the central portion of the vehicle for detecting deceleration at the central portion. The decision unit may compare the threshold with a change in the selection result selected by the selecting unit for a period before a value based on the deceleration at the central portion reaches a certain level, may decide whether a collision type of the vehicle is a symmetric or asymmetric on the basis of the comparison, and may output no decision on the collision type of the vehicle based on the left and right decelerations after the value based on the deceleration at the central portion reaches the certain level.

With such a structure, the device may ignore the peak of the selection result at the posterior impact stage after an asymmetric collision without using a trigger for detecting a collision beginning moment of the vehicle. Therefore, the device may utilize a great deceleration, which may inherently occur at the initial impact stage after a symmetric collision, as a key, and may discriminate symmetric collisions from asymmetric collisions readily, precisely, and quickly.

BRIEF DESCRIPTION OF THE DRAWINGS

With reference to the accompanying drawings, various embodiments of the present invention will be described hereinafter. In the drawings.

FIG. 3A includes graphs showing changes in outputs of elements of the collision type decision device in FIG. 1 when a symmetric collision has occurred;

FIG. 3B includes graphs showing changes in outputs of elements of the collision type decision device in FIG. 1 when an asymmetric collision has occurred;

FIGS. 8A through 8C are block diagrams showing collision type decision devices according to variations of the fifth embodiment, respectively;

FIG. 17A includes graphs showing changes in outputs of elements of the collision type decision device in FIG. 16 when a symmetric collision has occurred; and FIG. 17B includes graphs showing changes in outputs of elements of the collision type decision device in FIG. 16 when an asymmetric collision has occurred.

DETAILED DESCRIPTION OF PREFERRED EMBODIMENTS

First Embodiment.

Figure 1:
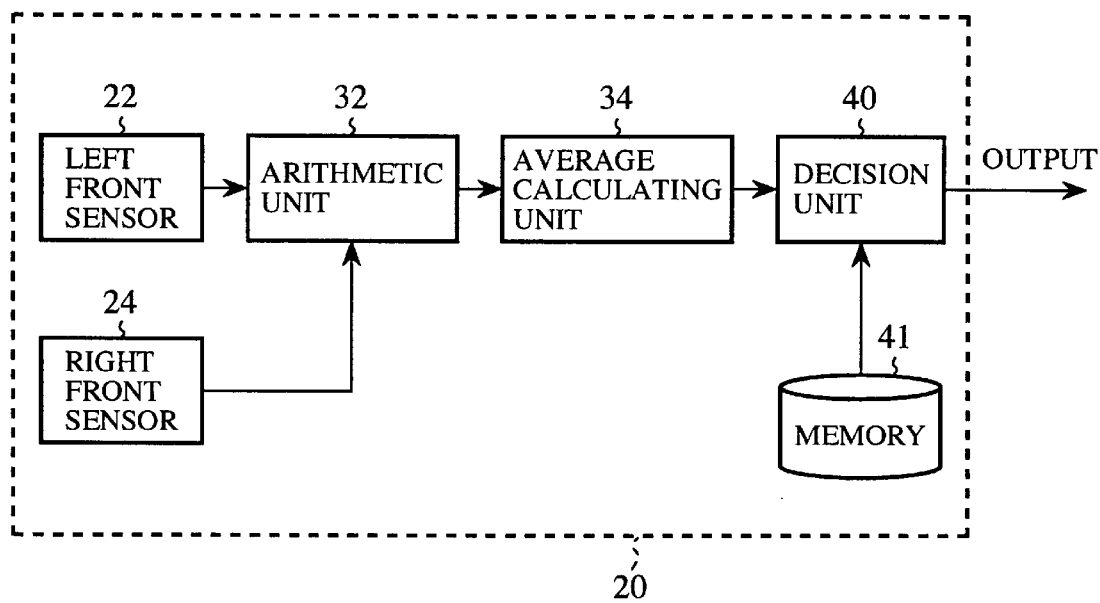
FIG. 1 is a block diagram showing a collision type decision device according to a first embodiment of the present invention.

FIG. 1 is a block diagram showing a collision type decision device according to a first embodiment of the present invention. In FIG. 1, numeral 20 depicts collision type decision device. The collision type decision device 20 includes a left front sensor (left deceleration detector) 22, a right front sensor (right deceleration detectors) 24, an arithmetic unit 32, an average calculating unit 34, a decision unit 40, and a memory 41.

Figure 2:
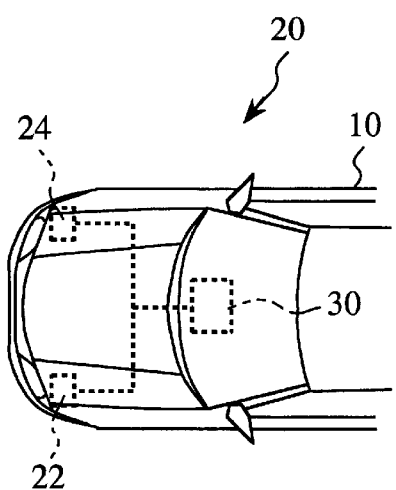
FIG. 2 is a plan view showing a vehicle, on which the collision type decision device in FIG. 1 is mounted.

FIG. 2 is a plan view showing a vehicle, on which the collision type decision device 20 according to the first embodiment is mounted. In FIG. 2, numeral 10 designates a vehicle containing an air bag ECU (electric control unit) 30.

Next, operations of the embodiment will be described. As shown in FIG. 2, the sensors 22 and 24 are acceleration sensors (satellite sensors) situated at the left and right front portions of the vehicle 10, respectively, and detect the accelerations (more exactly, decelerations) at the respective positions.

The arithmetic unit 32 in FIG. 1 makes calculations on the outputs Gl and Gr of the left and right sensors 22 and 24 to obtain respective arithmetic results f(Gl) and f(Gr) with respect to the left and right portions of the vehicle. Preferably, the arithmetic unit 32 obtains, as the arithmetic results f(Gl) and f(Gr), the moving averages obtained by integrating the outputs Gl and Gr over a given time span. However, the function f(x) achieved by the arithmetic unit 32 may be the velocity obtained by integrating the acceleration once about time, the jerk obtained by differentiating the acceleration once about time, the moving average obtained by integrating the acceleration over a given time span, the intensity of the acceleration at a specific frequency, or a resultant component of vectors representing the acceleration or another suitable measurement in the longitudinal or lateral direction.

The average calculating unit 34 calculates the average [f(Gl)+f(Gr)]/2 of the arithmetic results f(Gl) and f(Gr) obtained by the arithmetic unit 32, and then provides the decision unit 40 with the average. Since the arithmetic results f(Gl) and f(Gr) from the arithmetic unit 32 vary with time, the average calculating unit 34 calculates the average [f(Gl)+f(Gr)]/2 at regular time intervals and sequentially provides the decision unit 40 with the average [f(Gl)+f(Gr)]/2 that changes in accordance with a lapse of time.

The decision unit 40 compares the output of the average calculating unit 34, i.e., the average [f(Gl)+f(Gr)]/2 of the arithmetic results with a type-decision threshold Thr1. The memory 41 stores the type-decision threshold Thr1, so that the decision unit 40 can read out the type-decision threshold Thr1 from the memory 41. On the basis of the comparison, the decision unit 40 decides whether the collision type of the vehicle 10 is symmetric or asymmetric.

More specifically, if the output of the average calculating unit 34 becomes greater than the type-decision threshold Thr1 at any moment, the decision unit 40 decides that the vehicle 10 has experienced a symmetric collision. Otherwise, the decision unit 40 decides that the collision type that the vehicle 10 has experienced is an asymmetric collision. Directly after the decision, the decision unit 40 outputs a signal indicating the decision result.

The decision result signal from the decision unit 40 is used by the air bag ECU 30 (refer to FIG. 2) for controlling the activation of the air bag in the vehicle 10. Since the minimum deceleration or minimum velocity for activating the air bag for symmetric collision is different from that for asymmetric collision, the threshold for activating the air bag for symmetric collision is different from that for asymmetric collision. Therefore, the air bag ECU 30 sets the threshold for activating the air bag on the basis of the decision result by the decision unit 40. The threshold candidates for activating the air bag are stored, e.g., in a memory (not shown).

On the basis of the decision of collision type, the air bag ECU 30 selects the air-bag-activation threshold from the candidates in the memory, and compares the threshold with the deceleration or the velocity of the vehicle. If the deceleration or the velocity is higher than the air-bag-activation threshold, the air bag ECU 30 activates to inflate the air bag. In order to control the activation of the air bag, the air bag ECU 30 is preferably connected with an acceleration sensor (not shown) located in the driver/passenger's room of the vehicle 10 for notifying the air bag ECU 30 of the detected acceleration. Alternatively, the detection results from the acceleration sensors 22 and/or 24 may be used by the air bag ECU 30 to control the activation of the air bag.

Among the above-described structural elements of the collision type decision device 20, the arithmetic unit 32, the average calculating unit 34, and the decision unit 40 may be separate electric circuits. Alternatively, these elements may be virtual elements representing functions of a computer that operates according to a program in order that the functions can be understood readily.

In addition, the arithmetic unit 32, the average calculating unit 34, the decision unit 40, and the memory 41 may be parts of the air bag ECU 30 or provided independently of the air bag ECU 30. Furthermore, the collision type decision device is described in conjunction with activation of an air bag in this specification, but it is not intended to limit the present invention to the application of an air bag. Rather, it is intended that the scope of the present invention encompasses a device for deciding collision type to activating another type of driver/passenger protection apparatus.

FIGS. 3A and 3B include graphs showing outputs of the arithmetic unit 32 and the average calculating unit 34 of the collision type decision device 20 according to the first embodiment. FIG. 3A shows the results when a symmetric collision has occurred while FIG. 3B represents the results when an asymmetric collision has occurred. In the experiments for FIGS. 3A and 3B, the arithmetic results f(Gl) and f(Gr) output from the arithmetic unit 32 were the moving averages. As shown in FIG. 3A, when a symmetric collision has occurred, the arithmetic results f(Gl) and f(Gr) from the arithmetic unit 32 were even with each other, so that the average [f(Gl)+f(Gr)]/2 output from the average calculating unit 34 was equivalent to the arithmetic results f(Gl) and f(Gr).

It should be noted that the average [f(Gl)+f(Gr)]/2 from the average calculating unit 34 at the asymmetric collision was remarkably less than that at the symmetric collision as apparent from comparing FIG. 3A with FIG. 3B. Accordingly, the collision type can be identified by comparing the average [f(Gl)+f(Gr)]/2 from the average calculating unit 34 with the type-decision threshold Thr1. Specifically, if the average [f(Gl)+f(Gr)]/2 exceeds the type-decision threshold Thr1 for any while, it is possible to consider that the vehicle 10 has had a symmetric collision.

The type-decision threshold Thr1 could be determined on the basis of average curves that were changes in the averages of the arithmetic results with a lapse of time obtained in advance by experiments. More specifically, the type-decision threshold Thr1 was selected so as to be lower than the peak of the average [f(Gl)+f(Gr)]/2 at a symmetric collision in a lowest deceleration status for activating the air bag, but to be higher than the peak of the average [f(Gl)+f(Gr)]/2 at an asymmetric collision. In this case, the average [f(Gl)+f(Gr)]/2 at an asymmetric collision was the maximum average among the experiments when both arithmetic results f(Gl) and f(Gr) were increased for the reason of the errors of the sensors 22 and 24 by disturbances. Accordingly, the type-decision threshold Thr1 could be set easily.

As described above, by virtue of the first embodiment, it is possible to make appropriate decisions of collision type although there are measurement errors of deceleration detectors resulting from disturbances. Furthermore, the type-decision threshold Thr1 can be set easily.

Second Embodiment.

Figure 4:
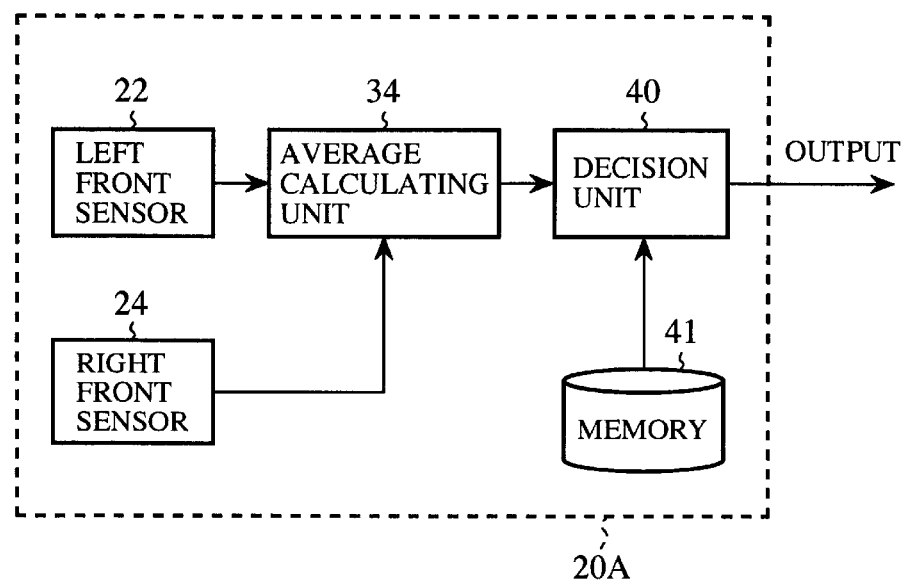
FIG. 4 is a block diagram showing a collision type decision device according to a second embodiment of the present invention.

FIG. 4 is a block diagram showing a collision type decision device according to a second embodiment of the present invention. In FIG. 4, numeral 20A designates a collision type decision device. The collision type decision device 20A includes a left front sensor 22, a right front sensor 24, an average calculating unit 34, a decision unit 40, and a memory 41. In FIG. 4, the same reference symbols are used for identifying structural elements that are common to those in FIG. 1, and they will not be described in detail.

The plan view showing a vehicle, on which the collision type decision device 20A according to the second embodiment is mounted, is the same as FIG. 2. The average calculating unit 34, decision unit 40, and memory 41 may be pats of the air bag ECU 30 or may be provided independently of the air bag ECU 30.

Next, operations of the embodiment will be described. In the second embodiment, the outputs Gl and Gr of the acceleration sensors 22 and 24 are not subjects for the arithmetic process that is carried out in the first embodiment. Instead, the outputs Gl and Gr are directly supplied to the average calculating unit 34. The average calculating unit 34 calculates the average (Gl+Gr)/2 of the respective decelerations detected by the sensors 22 and 24, and then provides the decision unit 40 with the average. Preferably, the average calculating unit 34 calculates the average (Gl+Gr)/2 at regular time intervals and sequentially provides the decision unit 40 with the average (Gl+Gr)/2 that changes in accordance with a lapse of time.

The decision unit 40 compares the output of the average calculating unit 34, i.e., the average (Gl+Gr)/2 of the decelerations with a type-decision threshold Thr1. The memory 41 stores the type-decision threshold Thr1, so that the decision unit 40 can read out the type-decision threshold Thr1 from the memory 41. On the basis of the comparison, the decision unit 40 decides whether the collision type of the vehicle 10 is symmetric or asymmetric.

More specifically, as similar to the first embodiment, if the output of the average calculating unit 34 becomes greater than the type-decision threshold Thr1 at any moment, the decision unit 40 decides that the vehicle 10 has experienced a symmetric collision. Otherwise, the decision unit 40 decides that the collision type that the vehicle 10 has experienced is an asymmetric collision. Directly after the decision, the decision unit 40 outputs a signal indicating the decision result. This signal is utilized by the air bag ECU 30 (FIG. 2) for controlling the activation of the air bag as similar to the first embodiment.

The theory of identification of collision type in the second embodiment is similar to that in the first embodiment. Although the material for the decision is the average of the decelerations rather than the average of arithmetic results on decelerations, the average (Gl+Gr)/2 output from the average calculating unit 34 at asymmetric collisions is remarkably less than that at symmetric collisions. Accordingly, as similar to the first embodiment, the type-decision threshold Thr1 can be set readily and suitably. Using the type-decision threshold Thr1, it is possible to make appropriate decisions of collision type.

As described above, by virtue of the second embodiment, it is possible to make appropriate decisions of collision type although there are measurement errors of deceleration detectors resulting from disturbances. Furthermore, the type-decision threshold Thr1 can be set easily.

Third Embodiment.

Figure 5:
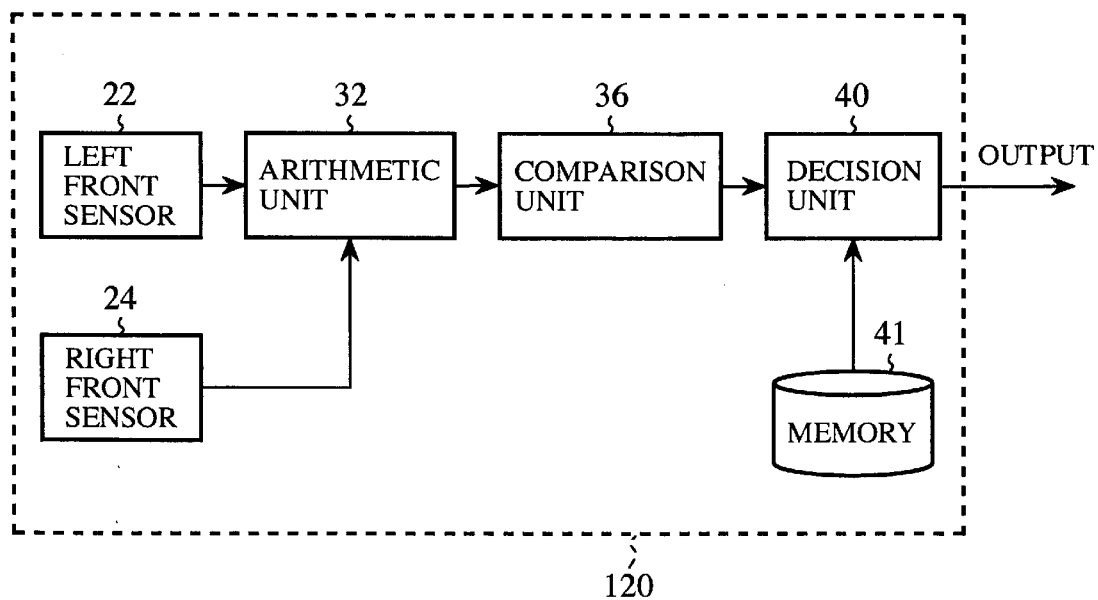
FIG. 5 is a block diagram showing a collision type decision device according to a third embodiment of the present invention.

FIG. 5 is a block diagram showing a collision type decision device according to a third embodiment of the present invention. In FIG. 5, numeral 120 designates a collision type decision device 120. The collision type decision device 120 includes a left front sensor (left deceleration detectors) 22, a right front sensor (right deceleration detectors) 24, an arithmetic unit 32, a comparison unit 36, a decision unit 40, and a memory 41. The plan view showing a vehicle, on which the collision type decision device 120 according to the third embodiment is mounted, is the same as FIG. 2.

Next, operations of the embodiment will be described. The sensors 22 and 24 are acceleration sensors disposed left and right front corners of a vehicle 10, respectively as shown in FIG. 2, and detect the accelerations (more exactly, decelerations) at the respective positions.

The arithmetic unit 32 in FIG. 5 makes calculations on the outputs Gl and Gr of the left and right sensors 22 and 24 to obtain respective arithmetic results f(Gl) and f(Gr) with respect to the left and right portions of the vehicle. Preferably, the arithmetic results f(Gl) and f(Gr) are the respective moving averages of outputs Gl and Gr. However, as described in conjunction with the first embodiment, the arithmetic results f(Gl) and f(Gr) may be the velocities, the jerks, the moving averages, the intensity levels of the acceleration at a specific frequency, or resultant components of vectors representing the acceleration or another suitable measurement in the longitudinal or lateral direction.

The comparison unit 36 compares the arithmetic results f(Gl) and f(Gr) obtained by the arithmetic unit 32 with each other, selects the lower arithmetic result MIN[f(Gl), f(Gr)], and supplies the selection result MIN[f(Gl), f(Gr)] to the decision unit 40. Since the arithmetic results f(Gl) and f(Gr) from the arithmetic unit 32 vary with time, the comparison unit 36 selects the minimum at regular time intervals and sequentially provides the decision unit 40 with the selection result MIN[f(Gl), f(Gr)] that changes in accordance with a lapse of time.

The decision unit 40 compares the output of the comparison unit 36, i.e., the selection result MIN[f(Gl), f(Gr)] with a type-decision threshold Thr2. The memory 41 stores the type-decision threshold Thr2, so that the decision unit 40 can read out the type-decision threshold Thr2 from the memory 41. On the basis of the comparison, the decision unit 40 decides whether the collision type of the vehicle 10 is symmetric or asymmetric.

More specifically, if the selection result MIN[f(Gl), f(Gr)] becomes greater than the type-decision threshold Thr2 at any moment, the decision unit 40 decides that the vehicle 10 has experienced a symmetric collision. Otherwise, the decision unit 40 decides that the collision type that the vehicle 10 has experienced is an asymmetric collision. Directly after the decision, the decision unit 40 outputs a signal indicating the decision result. The decision result signal from the decision unit 40 is used by the air bag ECU 30 (refer to FIG. 2) for controlling the activation of the air bag in the vehicle 10 as similar to the first embodiment.

Among the above-described structural elements of the collision type decision device 120, the arithmetic unit 32, the comparison unit 36, and the decision unit 40 may be separate electric circuits. Alternatively, these elements may be virtual elements representing functions of a computer that operates according to a program in order that the functions can be understood readily. In addition, the arithmetic unit 32, the comparison unit 36, the decision unit 40, and the memory 41 may be parts of the air bag ECU 30 or provided independently of the air bag ECU 30.

Figure 6A:
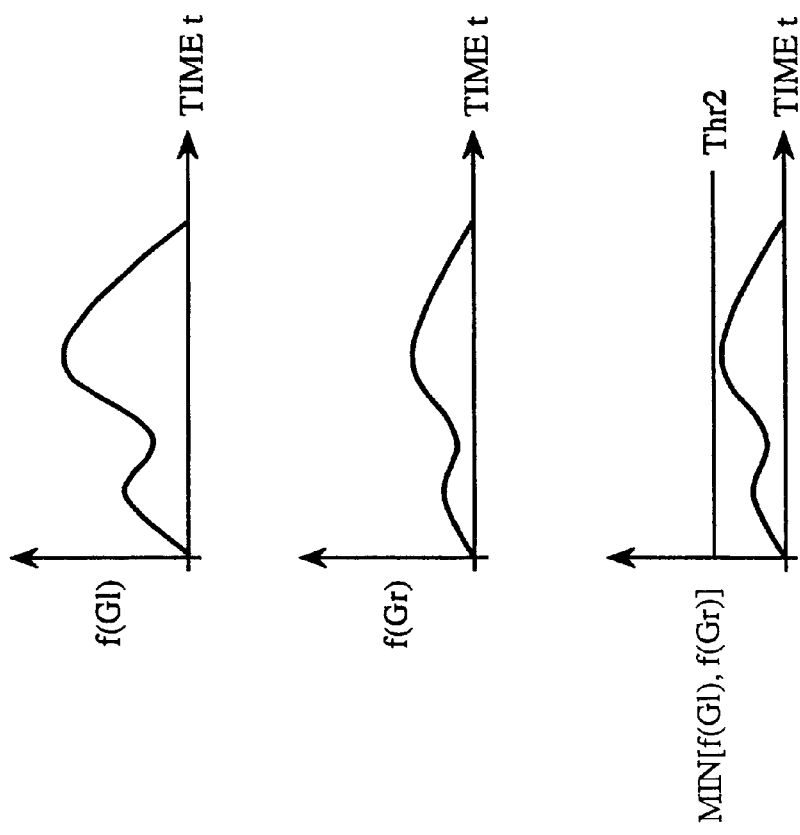
FIG. 6A includes graphs showing changes in outputs of elements of the collision type decision device in FIG. 5 when a symmetric collision has occurred.
Figure 6B:
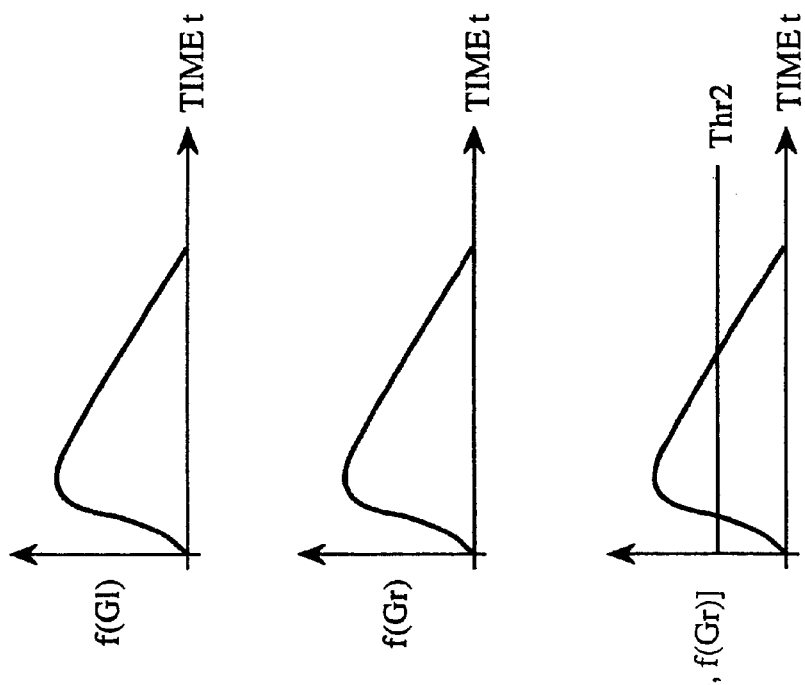
FIG. 6B includes graphs showing changes in outputs of elements of the collision type decision device in FIG. 5 when an asymmetric collision has occurred.

FIG. 6A and FIG. 6B include graphs showing outputs of arithmetic unit 32 and comparison unit 36 of the collision type decision device 120 according to the third embodiment. FIG. 6A represents the results when a symmetric collision has occurred while FIG. 6B shows the results when an asymmetric collision has occurred. In the experiments for FIGS. 6A and 6B, the arithmetic results f(Gl) and f(Gr) output from the arithmetic unit 32 were the moving averages. As shown in FIG. 6A, when a symmetric collision has occurred, the arithmetic results f(Gl) and f(Gr) from the arithmetic unit 32 were even with each other, so that the selection result MIN[f(Gl), f(Gr)] output from the comparison unit 36 was equivalent to the arithmetic results f(Gl) and f(Gr).

It should be noted that the selection result MIN[f(Gl), f(Gr)] at the asymmetric collision was remarkably less than that at the symmetric collision as apparent from comparing FIG. 6A with FIG. 6B. Accordingly, the collision type can be identified by comparing the selection result MIN[f(Gl), f(Gr)] with the type-decision threshold Thr2. That is, if the selection result MIN[f(Gl), f(Gr)] from the comparison unit 36 exceeds the type-decision threshold Thr2 for any while, it is possible to consider that the vehicle 10 has had a symmetric collision.

The type-decision threshold Thr2 could be determined on the basis of minimum curves that were changes in the minimums of the arithmetic results with a lapse of time obtained in advance by experiments. More specifically, the type-decision threshold Thr2 was selected so as to be lower than the peak of the selection result MIN[f(Gl), f(Gr)] at a symmetric collision in a lowest deceleration status for activating the air bag, but to be higher than the peak of the selection result MIN[f(Gl), f(Gr)] at an asymmetric collision. In this case, the selection result MIN[f(Gl), f(Gr)] at the asymmetric collision was the highest selection result among the experiments when both arithmetic results f(Gl) and f(Gr) were increased for the reason of the errors of the sensors 22 and 24 by disturbances. Accordingly, the type-decision threshold Thr2 could be set easily.

The selection result or minimum value MIN[f(Gl), f(Gr)] of the arithmetic results are used by the decision unit 40 instead of the average in accordance with the third embodiment, the difference between the decision material (selection result) at symmetric collisions and that at asymmetric collisions is greater in comparison with the first embodiment. Accordingly, in comparison with the first embodiment, it is possible to make more appropriate decisions of collision type, and setting of the type-decision threshold Thr2 can be achieved more readily.

As described above, by virtue of the third embodiment, it is possible to make appropriate decisions of collision type although there are measurement errors of deceleration detectors resulting from disturbances. Furthermore, the type-decision threshold Thr2 can be set easily.

Fourth Embodiment.

Figure 7:
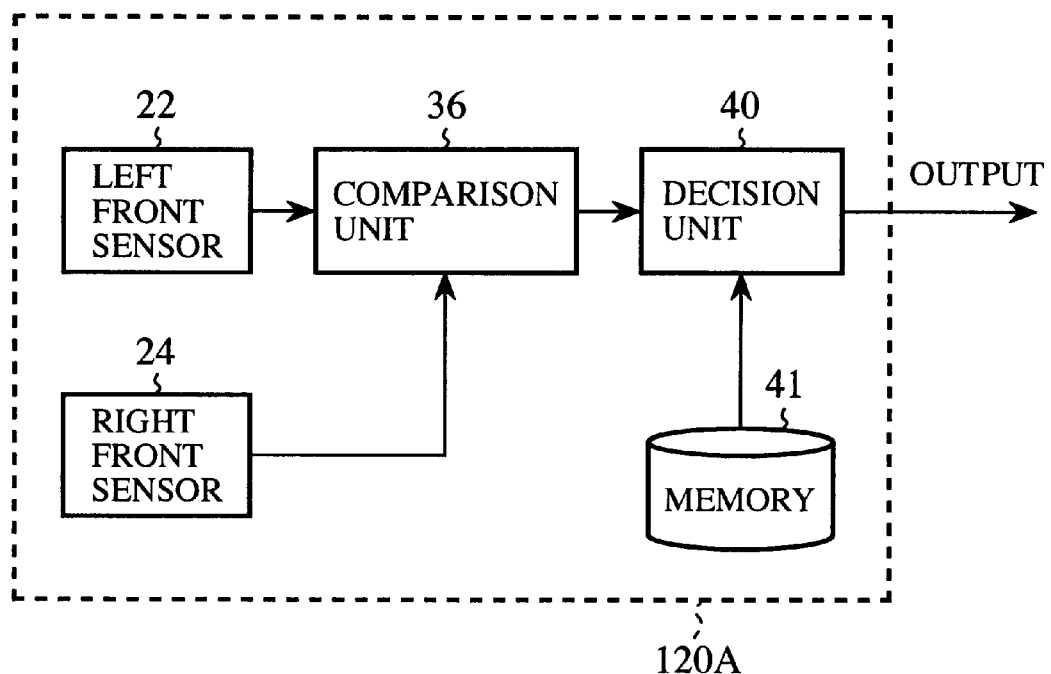
FIG. 7 is a block diagram showing a collision type decision device according to a fourth embodiment of the present invention.

FIG. 7 is a block diagram showing a collision type decision device according to a fourth embodiment of the present invention. In FIG. 7, numeral 120A designates a collision type decision device. The collision type decision device 120A includes a left front sensor 22, a right front sensor 24, a comparison unit 36, a decision unit 40, and a memory 41. In FIG. 7, the same reference symbols are used for identifying structural elements that are common to those in FIG. 1, and they will not be described in detail.

The plan view showing a vehicle, on which the collision type decision device 120A according to the fourth embodiment is mounted, is the same as FIG. 2. The comparison unit 36, decision unit 40, and memory 41 may be pats of the air bag ECU 30 or may be provided independently of the air bag ECU 30.

Next, operations of the embodiment will be described. In the fourth embodiment, the outputs Gl and Gr of the acceleration sensors 22 and 24 are not subjects for the arithmetic process that is carried out in the first embodiment. Instead, the outputs Gl and Gr are directly supplied to the comparison unit 36. The comparison unit 36 compares the decelerations Gl and Gr detected by the sensors 22 and 24 with each other, selects the lower deceleration MIN[Gl, Gr], and supplies the selection result MIN[Gl, Gr] to the decision unit 40. Preferably, the comparison unit 36 selects the minimum at regular time intervals and sequentially provides the decision unit 40 with the selection result MIN[Gl, Gr] that changes in accordance with a lapse of time.

The decision unit 40 compares the output of the comparison unit 36, i.e., the selection result MIN[Gl, Gr] with a type-decision threshold Thr2. The memory 41 stores the type-decision threshold Thr2, so that the decision unit 40 can read out the type-decision threshold Thr2 from the memory 41. On the basis of the comparison, the decision unit 40 decides whether the collision type of the vehicle 10 is symmetric or asymmetric.

More specifically, if the selection result MIN[Gl, Gr] becomes greater than the type-decision threshold Thr2 at any moment, the decision unit 40 decides that the vehicle 10 has experienced a symmetric collision as similar to the third embodiment. Otherwise, the decision unit 40 decides that the collision type that the vehicle 10 has experienced is an asymmetric collision. Directly after the decision, the decision unit 40 outputs a signal indicating the decision result. The decision result signal from the decision unit 40 is used by the air bag ECU 30 (refer to FIG. 2) for controlling the activation of the air bag in the vehicle 10 as similar to the first embodiment.

The theory of identification of collision type in the fourth embodiment is similar to that in the third embodiment. Although the material for the decision is the minimum among the decelerations rather than the minimum among arithmetic results on decelerations, the selection result MIN [Gl, Gr] output from the comparison unit 36 at asymmetric collisions is remarkably less than that at symmetric collisions. Accordingly, as similar to the third embodiment, the type-decision threshold Thr2 can be set readily and suitably. Using the type-decision threshold Thr2, it is possible to make appropriate decisions of collision type.

As described above, by virtue of the fourth embodiment, it is possible to make appropriate decisions of collision type although there are measurement errors of deceleration detectors resulting from disturbances. Furthermore, the type-decision threshold Thr2 can be set easily.

Fifth Embodiment.

Figure 8:
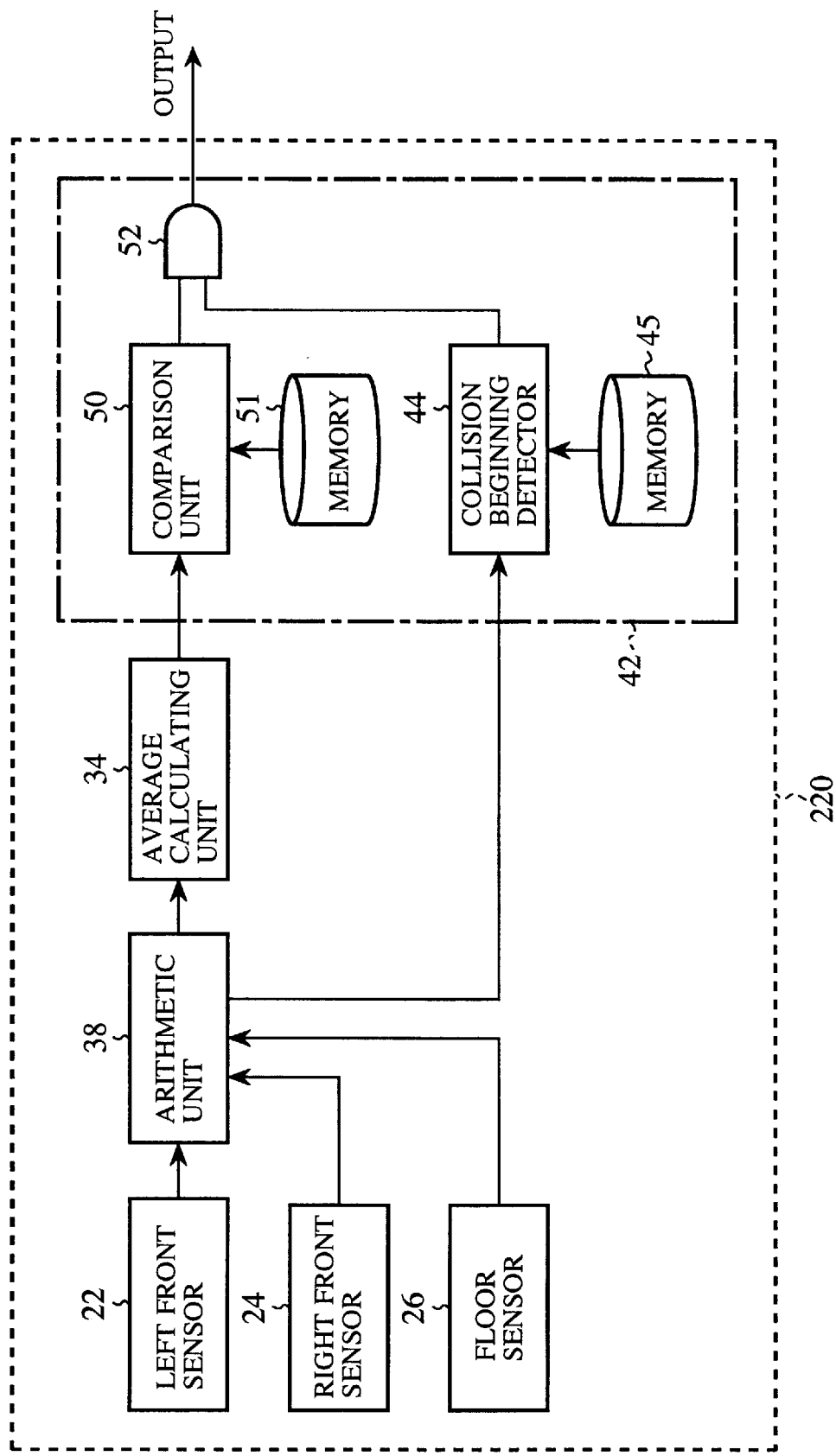
FIG. 8 is a block diagram showing a collision type decision device according to a fifth embodiment of the present invention.

FIG. 8 is a block diagram showing a collision type decision device according to a fifth embodiment of the present invention. In FIG. 8, numeral 220 designates a collision type decision device. The collision type decision device 220 includes a left front sensor (left deceleration detectors) 22, a right front sensor (right deceleration detectors) 24, a floor sensor (central deceleration detector) 26, an arithmetic unit 38, an average calculating unit 34, and a decision unit 42. The decision unit 42 includes a collision beginning detector 44, a memory 45, a comparison unit 50, a memory 51, and an AND gate 52.

Figure 9:
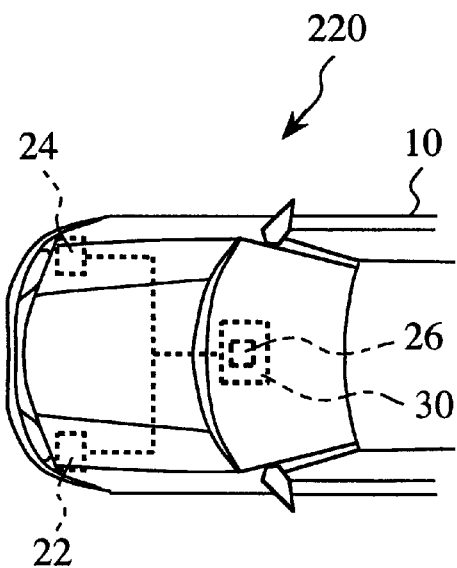
FIG. 9 is a plan view showing a vehicle, on which the collision type decision device in FIG. 8 is mounted.

FIG. 9 is a plan view showing a vehicle, on which the collision type decision device 220 according to the fifth embodiment is mounted. In FIG. 9, numeral 10 denotes a vehicle while numeral 30 depicts an air bag ECU.

Next, operations of the embodiment will be described. As shown in FIG. 9, the sensors 22 and 24 are acceleration sensors situated at the left and right front portions of the vehicle 10, respectively, and detect the accelerations (more exactly, decelerations) at the respective positions. The floor sensor 26 is also an acceleration sensor mounted on a portion near the central console in the vehicle 10 for detecting the accelerations (more exactly, decelerations) at the central portion of the vehicle 10.

The arithmetic unit 38 in FIG. 8 makes calculations on the outputs Gl and Gr of the left and right sensors 22 and 24 to obtain respective arithmetic results f(Gl) and f(Gr) with respect to the left and right portions of the vehicle. The arithmetic unit 38 also makes a calculation on the output Gm from the floor sensor 26 to obtain an arithmetic result f(Gm) with respect to the central portion of the vehicle. Consequently, the arithmetic unit 38 also has a function of a second arithmetic unit for obtaining the arithmetic result f(Gm) with respect to the central portion. However, in another embodiment, a second arithmetic unit for obtaining the arithmetic result f(Gm) with respect to the central portion may be provided separately from an arithmetic unit for obtaining respective arithmetic results f(Gl) and f(Gr) with respect to the left and right portions.

Preferably, the arithmetic results f(Gl), f(Gr), and f(Gm) are the respective moving averages of outputs Gl, Gr, and Gm. However, as described in conjunction with the first embodiment, the arithmetic results f(Gl), f(Gr), and f(Gm) may be the velocities, the jerks, the moving averages, the intensity levels of the acceleration at a specific frequency at the left, right and central portions of the vehicle, or resultant components of vectors representing the acceleration or another suitable measurement in the longitudinal or lateral direction.

The average calculating unit 34 calculates the average [f(Gl)+f(Gr)]/2 of the arithmetic results f(Gl) and f(Gr) obtained by the arithmetic unit 38, and then provides the comparison unit 50 of the decision unit 42 with the average. Since the arithmetic results f(Gl) and f(Gr) from the arithmetic unit 38 vary with time, the average calculating unit 34 calculates the average [f(Gl)+f(Gr)]/2 at regular time intervals and sequentially provides the comparison unit 50 with the average [f(Gl)+f(Gr)]/2 that changes in accordance with a lapse of time.

The comparison unit 50 compares the output of the average calculating unit 34, i.e., the average [f(Gl)+f(Gr)]/2 of the arithmetic results with a type-decision threshold Thr3. The memory 51 stores the type-decision threshold Thr3, so that the comparison unit 50 can read out the type-decision threshold Thr3 from the memory 51. On the basis of the comparison, the comparison unit 50 decides whether the collision type of the vehicle 10 is symmetric or asymmetric.

More specifically, if the output of the average calculating unit 34 becomes greater than the type-decision threshold Thr3 at any moment, the comparison unit 50 decides that the vehicle 10 has experienced a symmetric collision.

Otherwise, the comparison unit 50 decides that the collision type that the vehicle 10 has experienced is an asymmetric collision. Directly after the decision, the comparison unit 50 outputs a signal indicating the decision result. However, the output terminal of the comparison unit 50 is connected to an input terminal of the AND gate 52, so that the decision result signal from the comparison unit 50 is not always utilized as the decision result of the collision type decision device 220.

The collision beginning detector 44 continually monitors the arithmetic results f(Gm) with respect to the central portion of the vehicle 10 obtained by the arithmetic unit 38 and detects the collision beginning moment. More specifically, the collision beginning detector 44 periodically compares the arithmetic results f(Gm) with respect to the central portion with a collision-beginning-decision threshold Ef1. If the arithmetic results f(Gm) exceeds the collision-beginning-decision threshold Ef1, the collision beginning detector 44 outputs a high level signal indicating the collision beginning for a certain period thereafter.

The output terminal of the collision beginning detector 44 is connected with an input terminal of the AND gate 52, so that the above-mentioned high level signal is supplied to the AND gate 52 for the certain period after the collision beginning moment. The other input terminal of the AND gate 52 is connected with the comparison unit 50, whereby the decision result signal from the comparison unit 50 is supplied to the AND gate 52. The AND gate 52 outputs the decision result signal from the comparison unit 50 only when the high level signal is supplied from the collision beginning detector 44.

Accordingly, the decision unit 42 and hence the collision type decision device 220 output the decision result signal indicating that the collision type is symmetric or asymmetric for the certain period after the collision beginning moment. Afterward, the decision unit 42 and hence the collision type decision device 220 do not output the decision result irrespective of the decision result. The signal from the decision unit 42 is utilized by the air bag ECU 30 (FIG. 9) for controlling the activation of the air bag as similar to the first embodiment.

Among the above-described structural elements of the collision type decision device 220, the arithmetic unit 38, the average calculating unit 34, and the decision unit 42 may be separate electric circuits. Alternatively, these elements may be virtual elements representing functions of a computer that operates according to a program in order that the functions can be understood readily. In addition, the arithmetic unit 38, the average calculating unit 34, and the decision unit 42 may be parts of the air bag ECU 30 or provided independently of the air bag ECU 30.

Figure 10:
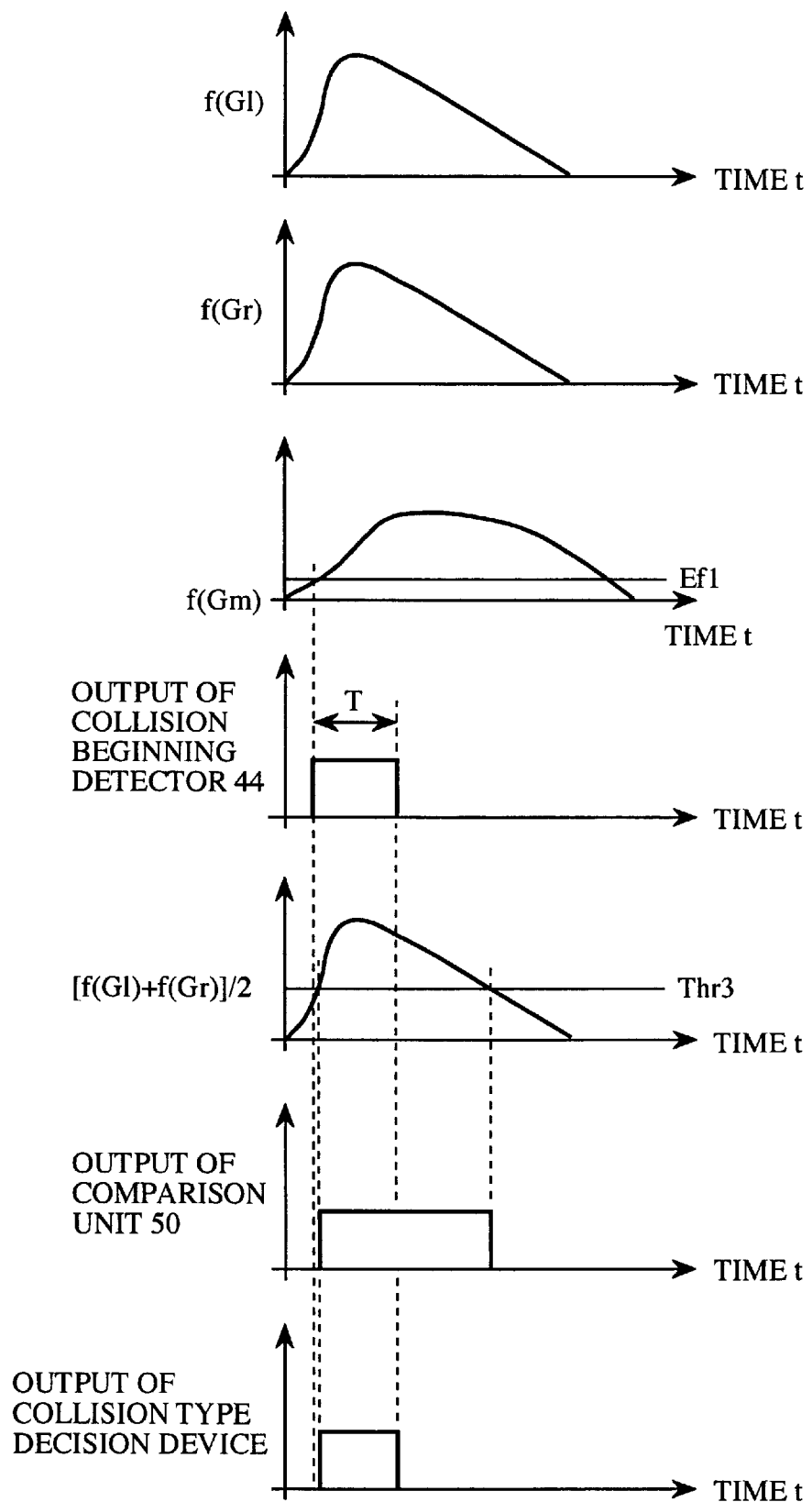
FIG. 10 includes graphs showing changes in outputs of elements of the collision type decision device in FIG. 8 when a symmetric collision has occurred.
Figure 11:
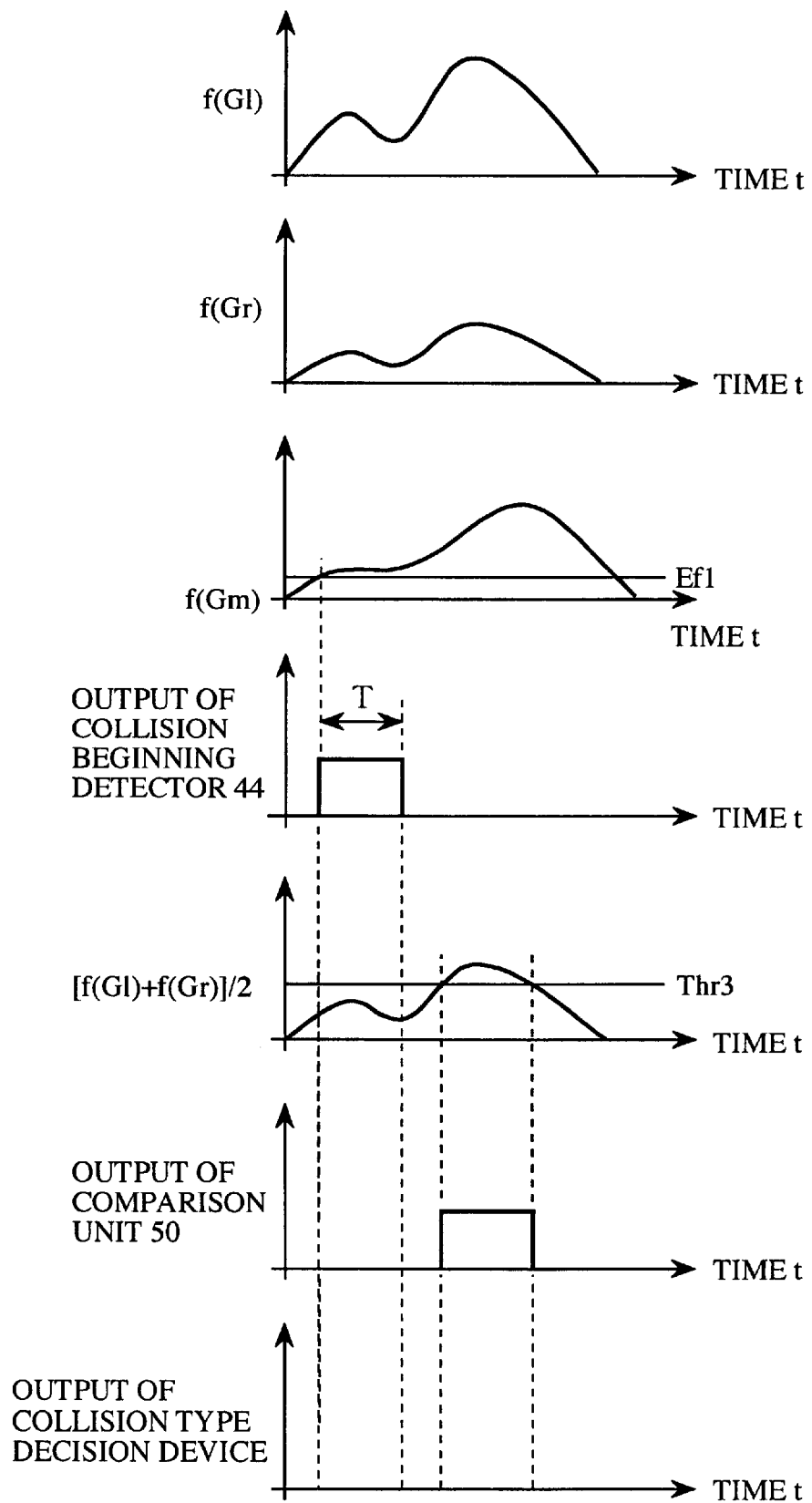
FIG. 11 includes graphs showing changes in outputs of elements of the collision type decision device in FIG. 8 when an asymmetric collision has occurred.

FIGS. 10 and 11 include graphs showing outputs of the arithmetic unit 38, collision beginning detector 44, average calculating unit 34, and comparison unit 50 of the collision type decision device 220 according to the fifth embodiment, and outputs of the collision type decision device 220 itself. In the experiments for FIGS. 10 and 11, the arithmetic results f(Gl), f(Gr), and f(Gm) output from the arithmetic unit 38 were the moving averages. FIG. 10 represents the results when a symmetric collision has occurred while FIG. 11 shows the results when an asymmetric collision has occurred.

As represented in FIGS. 10 and 11, the arithmetic unit 34 calculated the average $[f(Gl)+f(Gr)]/2$ of the arithmetic results f(Gl) and f(Gr) obtained by the arithmetic unit 38, and then output the average. The average $[f(Gl)+f(Gr)]/2$ at symmetric collisions was apparently greater than that at asymmetric collisions. However, the average $[f(Gl)+f(Gr)]/2$ at asymmetric collisions had a peak at the posterior stage that was higher than another peak at the initial stage.

While the average $[f(Gl)+f(Gr)]/2$ output from the average calculating unit 34 was higher than the type-decision threshold Thr3, the comparison unit 50 decided that the collision type of the vehicle 10 was symmetric, and then output a high level signal. Otherwise, the comparison unit 50 decided that the collision type of the vehicle 10 was asymmetric, and then output a low level signal.

In this embodiment, the type-decision threshold Thr3 was determined to be lower than the type-decision threshold Thr1 (FIGS. 3A and 3B) of the first embodiment. Accordingly, as shown in FIG. 11, although asymmetric collision has occurred, the high level signal representing symmetric collision was output from the comparison unit 50. However, such an erroneous signal was output from the comparison unit 50 after a certain period T from the collision beginning.

The collision beginning detector 44 monitored the arithmetic result f(Gm) from the arithmetic unit 38. When the arithmetic results f(Gm) exceeded the collision-beginning-decision threshold Ef1, the collision beginning detector 44 output a high level signal for the certain period T thereafter. By virtue of the above-mentioned function of the AND gate 52, the signal representing the decision result by the comparison unit 50 was output from the collision type decision device 220 only for the certain period at which the high level signal was output from the collision beginning detector 44.

As shown in FIG. 11, the average $[f(Gl)+f(Gr)]/2$ at the asymmetric collision had a peak at the posterior stage that was higher than another peak at the initial stage. The higher peak might exceed the type-decision threshold Thr3, causing that the comparison unit 50 output a high level signal representing symmetric collision. However, the output of the collision type decision device 220 was restricted by the AND gate 52 at the posterior stage since the certain period T had passed after the collision beginning. As a result, the erroneous signal was not output finally.

This embodiment accomplishes the following merits. Since the device may ignore the peak of the average $[f(Gl)+f(Gr)]/2$ at the posterior stage after an asymmetric collision, the type-decision threshold Thr3 for discriminating symmetric collisions from asymmetric collisions can be set to be low. Since the device may ignore the peak of the average $[f(Gl)+f(Gr)]/2$ at the posterior stage after an asymmetric collision, the device may utilize a great deceleration, which may inherently occur at the initial impact stage after a symmetric collision, as a key, and may discriminate symmetric collisions from asymmetric collisions readily, precisely, and quickly. Furthermore, if the type-decision threshold Thr3 is set to be lower, the collision type decision can be achieved more quickly. Additionally, if the collision-beginning-decision threshold Ef1 is set to be higher than an arithmetic result f(Gm) measured when the vehicle ran a rough road without accidents, unnecessary collision type decision can be prevented.

As described above, by virtue of the fifth embodiment, it is possible to make appropriate decisions of collision type although there are measurement errors of deceleration detectors resulting from disturbances. Especially, the device may utilize a great deceleration, which may inherently occur at the initial impact stage after a symmetric collision, as a key, and may discriminate symmetric collisions from asymmetric collisions readily, precisely, and quickly. Furthermore, the type-decision threshold Thr3 can be set easily.

The fifth embodiment is a modification of the first embodiment (FIG. 1). More specifically, in the fifth embodiment, the arithmetic results f(Gl) and f(Gr) on the left and right decelerations of the vehicle 10 are obtained by the arithmetic unit 38. The collision type is decided on the basis of the average [f(Gl)+f(Gr)]/2, but the output duration of the decision result from the decision unit 42 is restricted by the collision beginning detector 44 and the AND gate 52. Similar modifications may be applied to the second through fourth embodiments so that the output duration of the decision result on the collision type can be restricted to a certain period after the collision beginning moment.

Figure 8A:
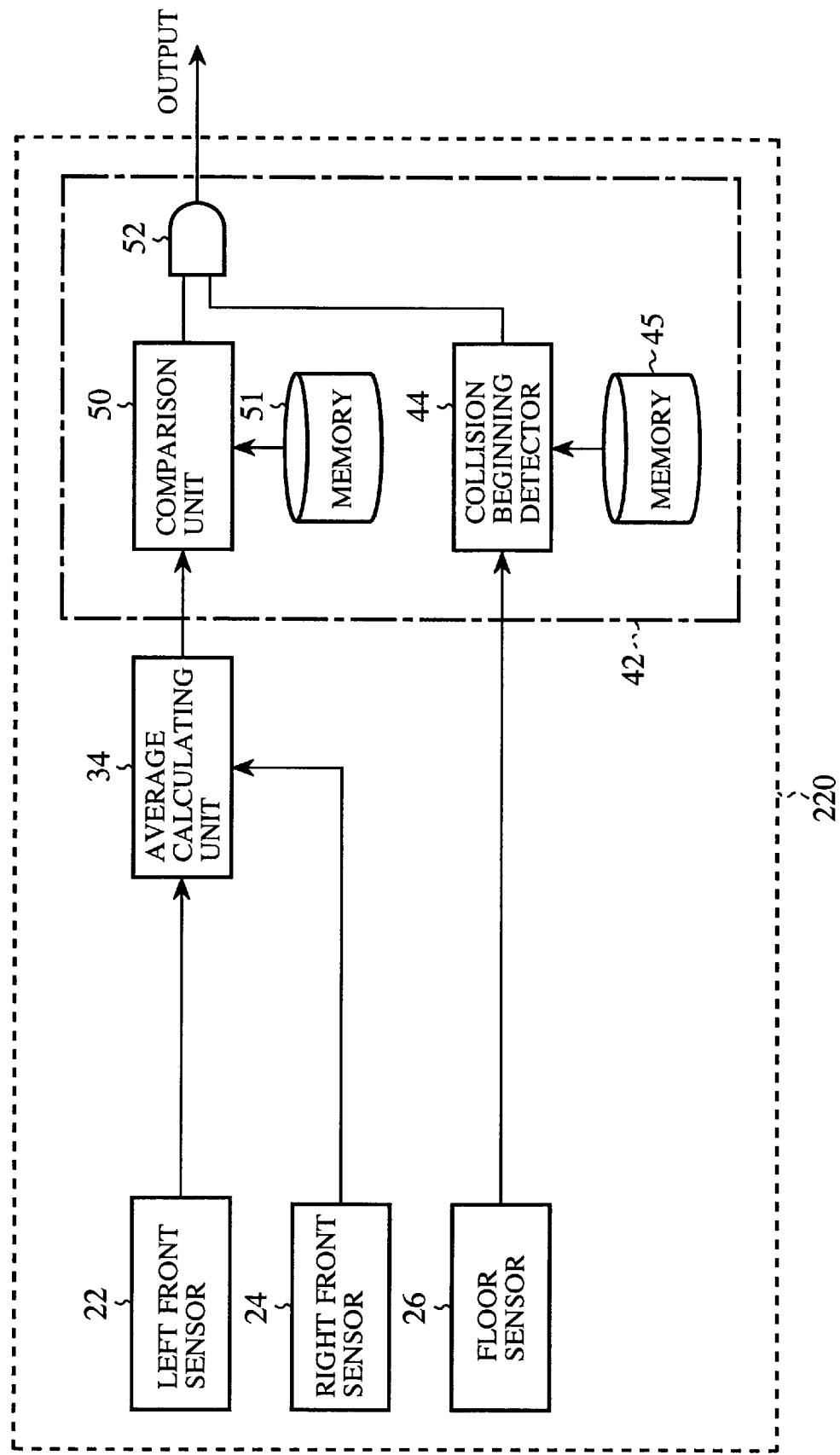
Figure 8B:
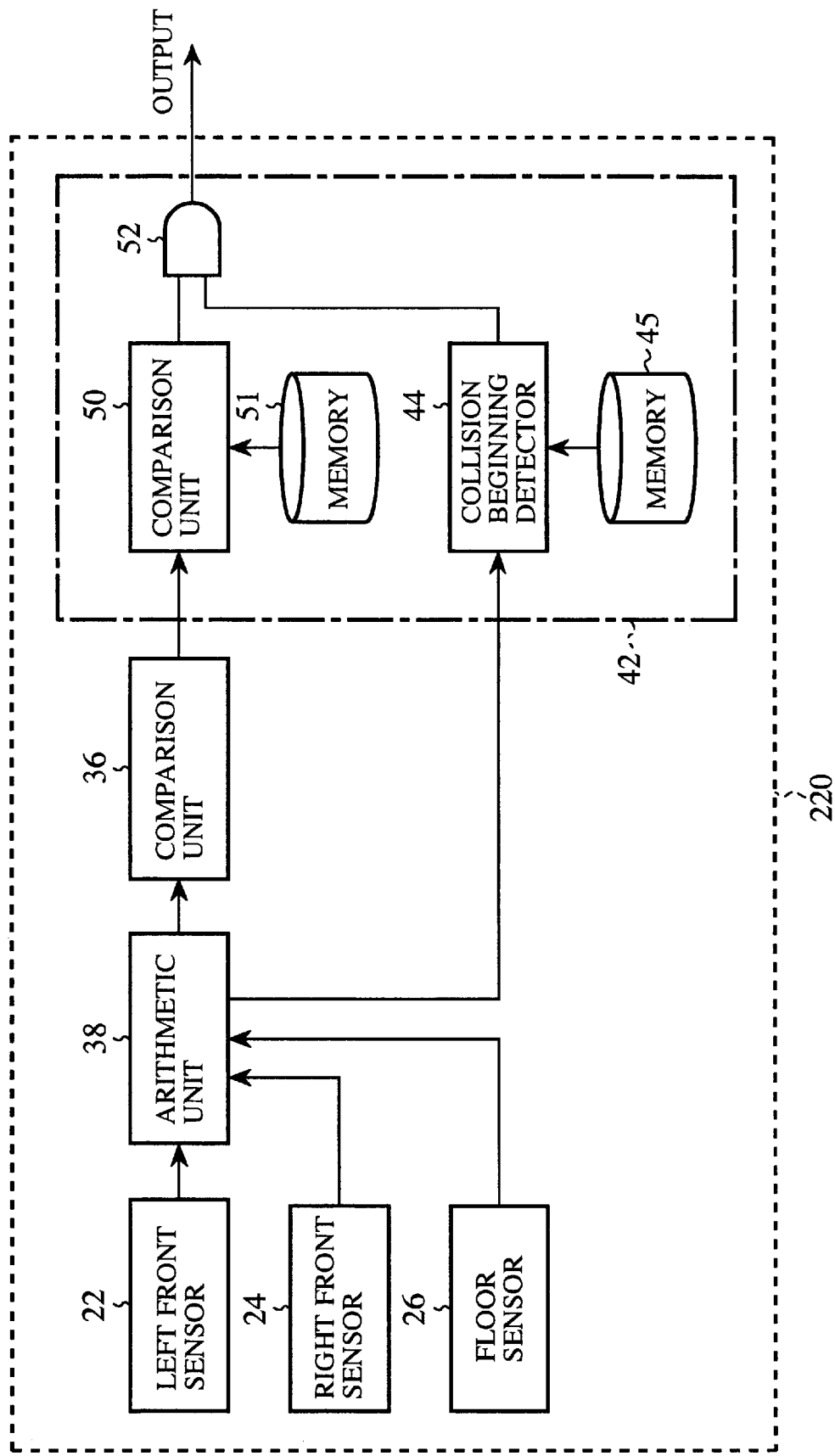

FIGS. 8A through 8C are block diagrams showing collision type decision devices of variations of the fifth embodiment according to the above-mentioned idea, respectively. In the variation shown in FIG. 8a, as similar to the second embodiment (FIG. 2), the average calculating unit 34 calculates the average of the left and right decelerations Gl and Gr that are the outputs of the sensors 22 and 24, and the comparison unit 50 compares the average (Gl+Gr)/2 with another type-decision threshold Thr3 for deciding the collision type. The output Gm of the floor sensor 26 is provided to the collision beginning detector 44 without being subject to the arithmetic process, and the collision beginning detector 44 detects the collision beginning moment on the basis of the output Gm.

In the variation shown in FIG. 8b, as similar to the third embodiment (FIG. 5), the arithmetic unit 38 makes calculations on the outputs Gl and Gr of the left and right sensors 22 and 24, and the comparison unit 36 selects the lower arithmetic result MIN[f(Gl), f(Gr)]. The comparison unit 50 compares the selection result MIN[f(Gl), f(Gr)] with another type-decision threshold Thr3 for deciding the collision type. The output Gm of the floor sensor 26 is subject to the arithmetic process by the arithmetic unit 38, and the collision beginning detector 44 detects the collision beginning moment on the basis of the arithmetic result f(Gm).

In the variation shown in FIG. 8c, as similar to the fourth embodiment (FIG. 7), the comparison unit 36 selects the selection result MIN[Gl, Gr] among the left and right decelerations Gl and Gr that are the outputs of the sensors 22 and 24, and the comparison unit 50 compares the selection result MIN[Gl, Gr] with another type-decision threshold Thr3 for deciding the collision type. The output Gm of the floor sensor 26 is provided to the collision beginning detector 44 without being subject to the arithmetic process, and the collision beginning detector 44 detects the collision beginning moment on the basis of the output Gm.

In the fifth embodiment, the collision beginning detector 44 detects the collision beginning moment on the basis of only the arithmetic result f(Gm) of the output Gm that is the deceleration detected by the floor sensor 26. However, the collision beginning moment may be detected on the basis of at least one of the arithmetic results f(Gl) and f(Gr) of the outputs Gl and Gr that are the decelerations detected by the left and right sensors 22 and 24 in addition to the arithmetic result f(Gm).

Furthermore, the collision beginning moment may be detected on the basis of the output Gm of the floor sensor 26 that is not a subject for the arithmetic process, or on the basis of the output Gm and at least one of the outputs Gl and Gr of the sensors 22 and 24. The above-described variations shown in FIGS. 8A and 8C are based on this idea. Conversely, the output Gm of the floor sensor 26 may be subject to the arithmetic process, and the collision type may be decided on the basis of the arithmetic result f(Gm). It is intended that these modifications are encompassed in the scope of the present invention.

Sixth Embodiment.

Figure 12:
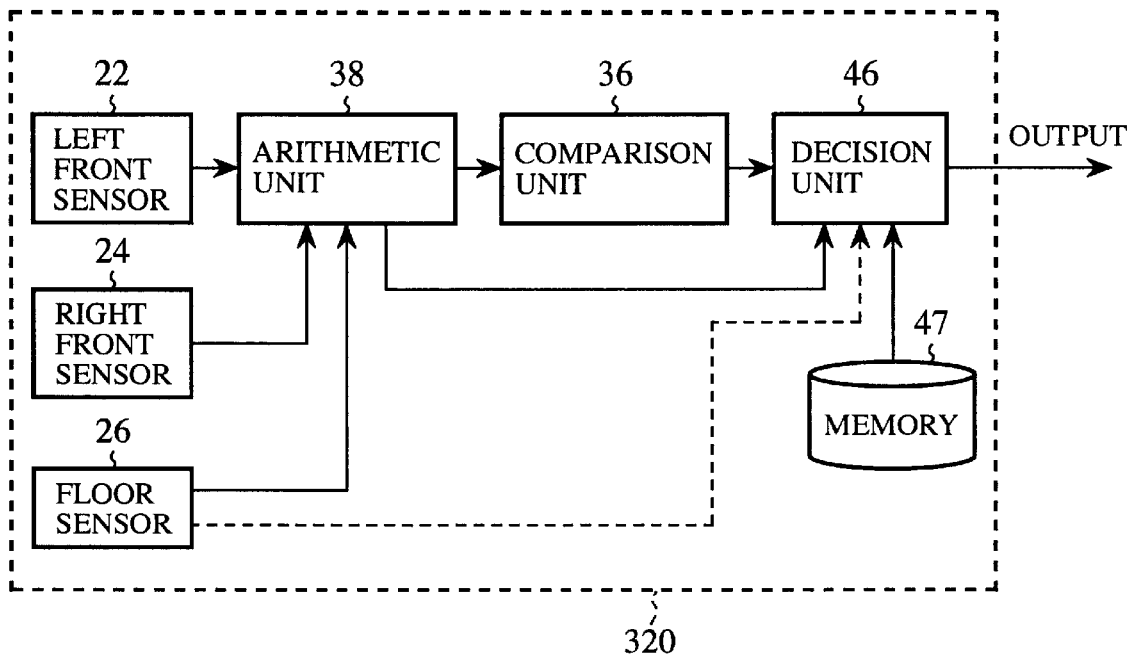
FIG. 12 is a block diagram showing a collision type decision device according to a sixth embodiment of the present invention.

FIG. 12 is a block diagram showing a collision type decision device according to a sixth embodiment of the present invention. In FIG. 12, numeral 320 designates a collision type decision device. The collision type decision device 320 includes a left front sensor (left deceleration detectors) 22, a right front sensor (right deceleration detectors) 24, an arithmetic unit 38, a comparison unit 36, a decision unit 46, and a memory 47.

The plan view showing a vehicle, on which the collision type decision device 320 according to the sixth embodiment is mounted, is the same as FIG. 9.

As shown in FIG. 9, the sensors 22 and 24 are acceleration sensors situated at the left and right front portions of the vehicle 10, respectively, and detect the accelerations (more exactly, decelerations) at the respective positions. The floor sensor 26 is also an acceleration sensor mounted on a portion near the central console in the vehicle 10 for detecting the accelerations (more exactly, decelerations) at the central portion of the vehicle 10.

The arithmetic unit 38 in FIG. 12 makes calculations on the outputs Gl and Gr of the left and right sensors 22 and 24 to obtain respective arithmetic results f(Gl) and f(Gr) with respect to the left and right portions of the vehicle. The arithmetic unit 38 also makes a calculation on the output Gm from the floor sensor 26 to obtain an arithmetic result f(Gm) with respect to the central portion of the vehicle. Consequently, the arithmetic unit 38 also has a function of a second arithmetic unit for obtaining the arithmetic result f(Gm) with respect to the central portion. However, in another embodiment, a second arithmetic unit for obtaining the arithmetic result f(Gm) with respect to the central portion may be provided separately from an arithmetic unit for obtaining respective arithmetic results f(Gl) and f(Gr) with respect to the left and right portions.

Preferably, the arithmetic results f(Gl), f(Gr), and f(Gm) are the respective moving averages of outputs Gl, Gr, and Gm. However, as described in conjunction with the first embodiment, the arithmetic results f(Gl), f(Gr), and f(Gm) may be the velocities, the jerks, the moving averages, the intensity levels of the acceleration at a specific frequency at the left, right and central portions of the vehicle, or resultant components of vectors representing the acceleration or another suitable measurement in the longitudinal or lateral direction.

The comparison unit 36 compares the arithmetic results f(Gl) and f(Gr) obtained by the arithmetic unit 38 with each other, selects the lower arithmetic result MIN[f(Gl), f(Gr)], and supplies the selection result MIN[f(Gl), f(Gr)] to the decision unit 46. Since the arithmetic results f(Gl) and f(Gr) vary with time, the comparison unit 36 selects the minimum at regular time intervals and sequentially provides the decision unit 46 with the selection result MIN[f(Gl), f(Gr)] that changes in accordance with a lapse of time.

Figure 13:
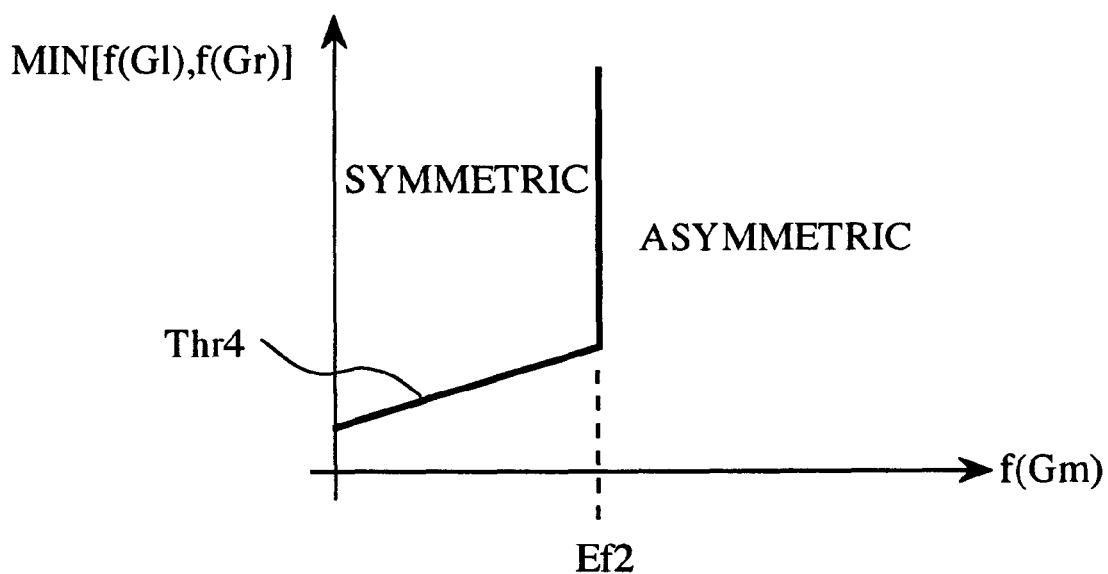
FIG. 13 is a graph showing a decision map used by a decision unit of the collision type decision device in FIG. 12.

The decision unit 46 compares the output of the comparison unit 36, i.e., the selection result MIN[f(Gl), f(Gr)] with a type-decision threshold Thr4. As represented in FIG. 13, the type-decision threshold Thr4 varies depending upon the arithmetic result f(Gm) with respect to the central portion of the vehicle output from the arithmetic unit 38. When the arithmetic result f(Gm) is less than a prescribed value Ef2, the type-decision threshold Thr4 increases as the arithmetic result f(Gm) increases. When the arithmetic result f(Gm) is equal to or greater than a prescribed value Ef2, the type-decision threshold Thr4 is infinite or sufficiently great.

The memory 47 stores a map representing the variable type-decision threshold Thr4. The decision unit 46 can read out memory 47 the type-decision threshold Thr4 that corresponds to the arithmetic result f(Gm) obtained by the arithmetic unit 38. Since the arithmetic result f(Gm) from the arithmetic unit 38 vary with time, the comparison unit 46 reads out the type-decision threshold Thr4 from the memory 47 at regular time intervals. On the basis of the selection result MIN[f(Gl), f(Gr)] that changes with a lapse of time and the type-decision threshold Thr4 that also changes with a lapse of time, the decision unit 46 decides whether the collision type of the vehicle 10 is symmetric or asymmetric.

Figure 14:
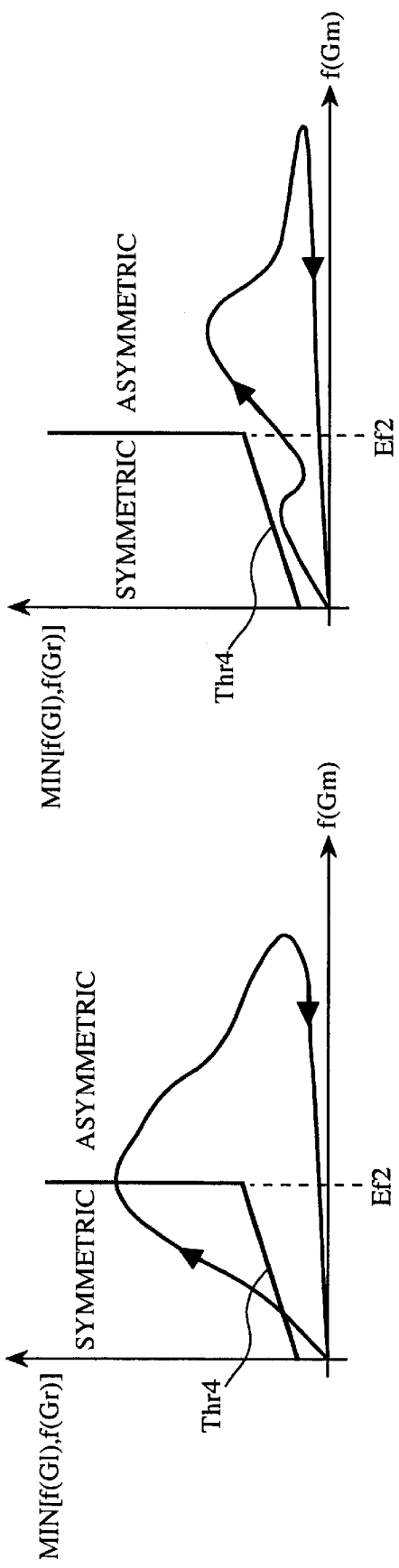
FIG. 14A is a graph showing on the map in FIG. 13 a change in output of a comparison unit of the collision type decision device in FIG. 12 when a symmetric collision has occurred.
FIG. 14B is a graph showing on the map in FIG. 13 a change in output of a comparison unit of the collision type decision device in FIG. 12 when an asymmetric collision has occurred.

More specifically, as shown in FIG. 14A, when the arithmetic result f(Gm) is less than the prescribed value Ef2, if the selection result MIN[f(Gl), f(Gr)] becomes greater than the type-decision threshold Thr4 at any moment, the decision unit 46 decides that the vehicle 10 has experienced a symmetric collision. On the other hand, as shown in FIG. 14B, when the arithmetic result f(Gm) is less than the prescribed value Ef2, if the selection result MIN[f(Gl), f(Gr)] never exceed the type-decision threshold Thr4, the decision unit 46 decides that the collision type of the vehicle 10 is asymmetric collision.

When the arithmetic result f(Gm) is equal to or greater than the prescribed value Ef2, the selection result MIN[f(Gl), f(Gr)] from the comparison unit 36 can never exceed the type-decision threshold Thr4, which is sufficiently great. Therefore, in this stage, the decision unit 46 absolutely decides that the collision type is asymmetric. Consequently, until the arithmetic result f(Gm) with respect to the central portion of the vehicle 10 reaches the prescribed value Ef2, the decision unit 46 compares the change in the selection result MIN[f(Gl), f(Gr)] with type-decision threshold Thr4, and decides whether the collision type of the vehicle 10 is symmetric or asymmetric on the basis of the comparison. However, the decision unit 46 does not substantially decide the collision type of the vehicle 10 after the arithmetic result f(Gm) with respect to the central portion reaches the prescribed value Ef2.

Directly after the decision, the decision unit 46 outputs a signal indicating the decision result. The decision result signal from the decision unit 46 is used by the air bag ECU 30 (refer to FIG. 9) for controlling the activation of the air bag in the vehicle 10 as similar to the first embodiment.

Among the above-described structural elements of the collision type decision device 320, the arithmetic unit 38, the comparison unit 36, and the decision unit 46 may be separate electric circuits. Alternatively, these elements may be virtual elements representing functions of a computer that operates according to a program in order that the functions can be understood readily. In addition, the arithmetic unit 38, the comparison unit 36, the decision unit 46, and the memory 47 may be parts of the air bag ECU 30 or provided independently of the air bag ECU 30.

As described above, by virtue of the sixth embodiment, since the collision type of the vehicle 10 is not substantially decided after the arithmetic result f(Gm) with respect to the central portion reaches the prescribed value Ef2, the duration for deciding the collision type after the collision beginning moment is limited. Accordingly, the device may ignore the peak of the selection result MIN[f(Gl), f(Gr)] from the comparison unit 36 at the posterior stage after an asymmetric collision without using a trigger (e.g., the collision beginning detector 44 of the fifth embodiment) for detecting a collision beginning moment. Since the peak of the selection result MIN[f(Gl), f(Gr)] from the comparison unit 36 at the posterior stage after an asymmetric collision is ignored, the device may utilize a great deceleration, which may inherently occur at the initial impact stage after a symmetric collision, as a key, and may discriminate symmetric collisions from asymmetric collisions readily and quickly.

In addition, since the peak of the selection result MIN[f(Gl), f(Gr)] from the comparison unit 36 at the posterior stage after an asymmetric collision is ignored, the type-decision threshold Thr4 can be set to be low. This can make the decision of collision type quicker.

Furthermore, if the type-decision threshold Thr4 varying in the initial stage after collision is suitably set, it is possible to make appropriate decisions of collision type although there are measurement errors of deceleration detectors resulting from disturbances.

The above-described sixth embodiment is a modification of the third embodiment (FIG. 5) and decides collision type on the basis of the selection result MIN[f(Gl), f(Gr)] in the duration before the arithmetic result f(Gm) with respect to the portion near the central portion reaches the prescribed value Ef2. Similar modifications may be applied to the first, second and fourth embodiments.

Figure 12A:
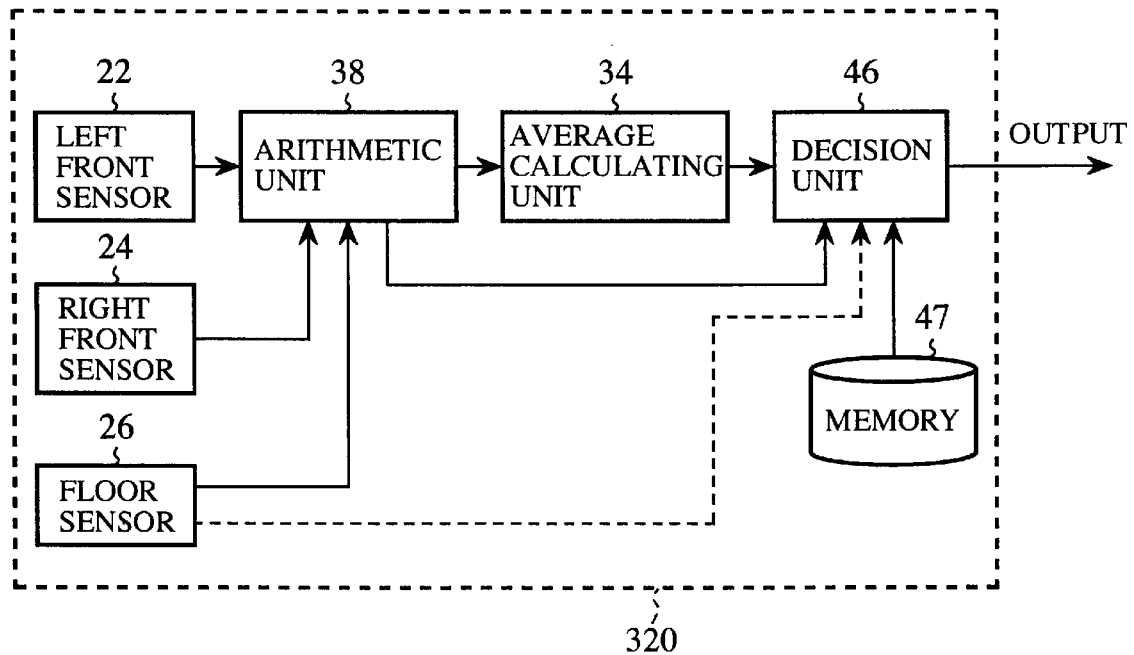
FIGS. 12A through 12C are block diagrams showing collision type decision devices according to variations of the sixth embodiment, respectively.
Figure 12B:
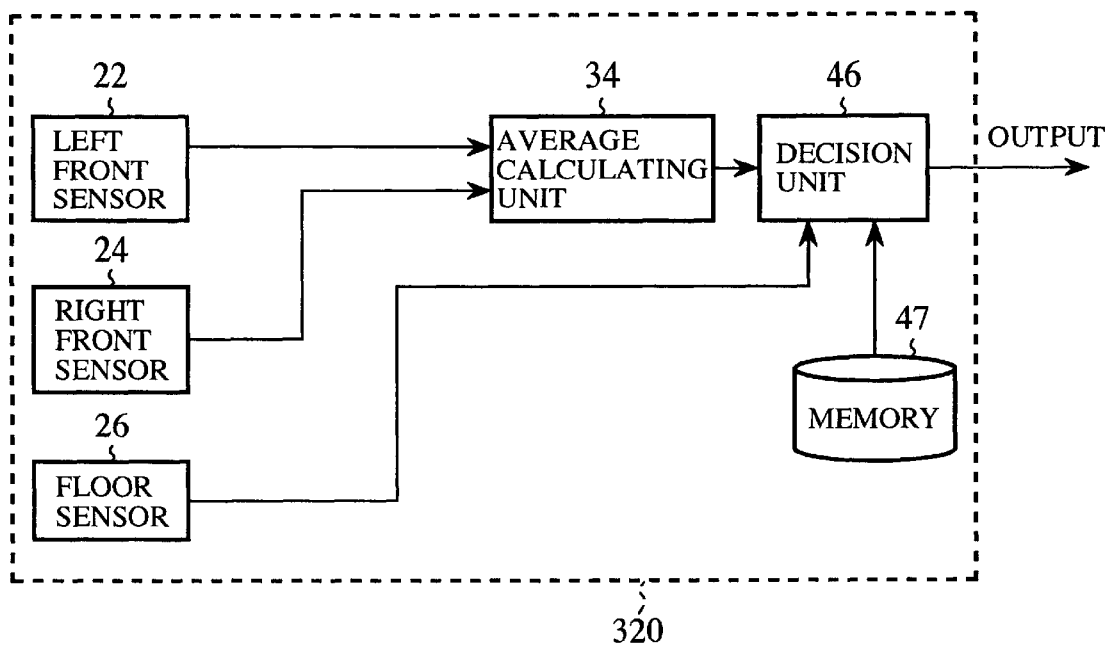
Figure 12C:
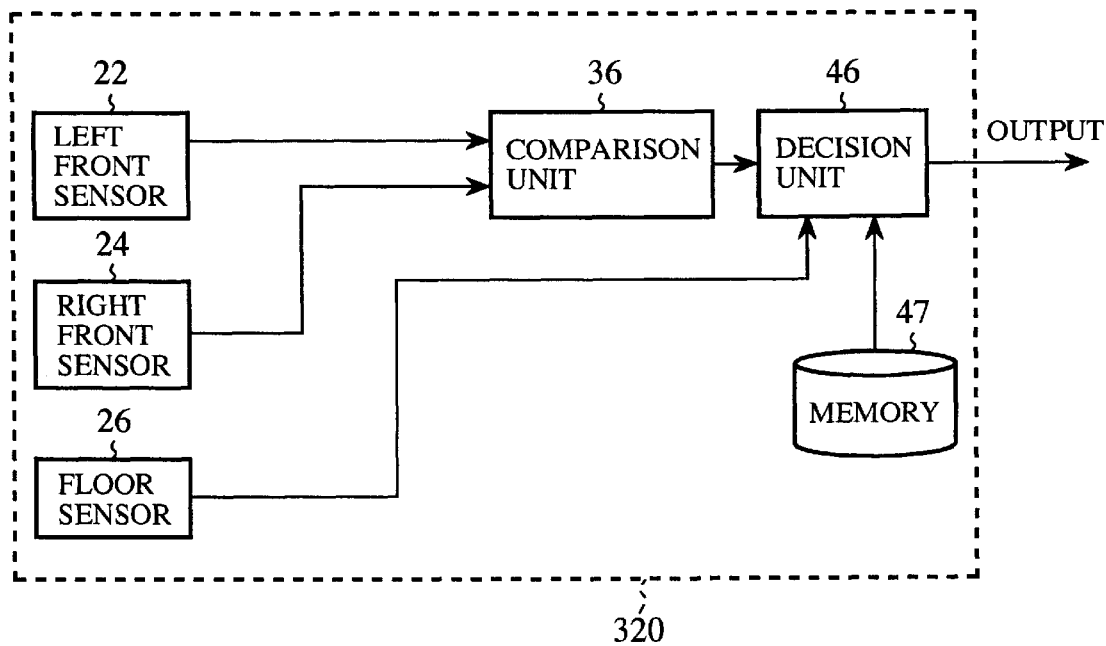

FIGS. 12A through 12C are block diagrams showing collision type decision devices of variations of the sixth embodiment according to the above-mentioned idea, respectively. In the variation shown in FIG. 12A, as similar to the first embodiment (FIG. 1), the average calculating unit 34 obtains the average [f(Gl)+f(Gr)]/2. The decision unit 46 decides the collision type on the basis of the average [f(Gl)+f(Gr)]/2 in the duration before the arithmetic result f(Gm) with respect to the portion near the central portion reaches the prescribed value Ef2.

In the variation shown in FIG. 12B, as similar to the second embodiment (FIG. 4), the average calculating unit 34 obtains the average (Gl+Gr). The decision unit 46 decides the collision type on the basis of the average (Gl+Gr)/2 in the duration before the deceleration (which is not subject to the arithmetic process) with respect to the portion near the central portion reaches another prescribed value Ef2.

In the variation shown in FIG. 12C, as similar to the fourth embodiment (FIG. 7), the comparison unit 36 obtains the selection result MIN[Gl, Gr]. The decision unit 46 decides the collision type on the basis of the selection result MIN[Gl, Gr] in the duration before the deceleration (which is not subject to the arithmetic process) with respect to the portion near the central portion reaches another prescribed value Ef2.

In the sixth embodiment, the stage for deciding collision type is substantially limited on the basis of the arithmetic result f(Gm) of the output Gm, which is the deceleration of the central portion detected by the floor sensor 26. However, it is possible to omit the arithmetic process to the output Gm. In an modified embodiment, until the deceleration at the portion near the central portion reaches a prescribed value, the "average" or the "selection result" may be a subject for the comparison with a threshold for deciding whether the collision type of the vehicle is symmetric or asymmetric. In addition, the collision type of the vehicle may not be substantially decided after the central deceleration reaches the prescribed value. In this case, the output Gm is directly supplied from the floor sensor 26 to the decision unit 46 as denoted by the dotted line in FIG. 12. The variations shown in FIGS. 12B and 12C are based on this idea. Conversely, the output Gm of the floor sensor 26 may be subject to the arithmetic process, and the stage for deciding collision type may be substantially limited on the basis of the arithmetic result f(Gm). It is intended that these modifications are encompassed in the scope of the present invention.

Seventh Embodiment.

Next, the seventh embodiment according to the present invention will be described. The seventh embodiment is a modification of the above-described sixth embodiment. The structure of the collision type decision device according to the seventh embodiment can be the same as that according to the sixth embodiment shown in FIG. 12. The arrangement of the collision type decision device in the vehicle 10 can be the same as than shown in FIG. 9.

Next, operations of the embodiment will be described. In accordance with the above-described sixth embodiment, the decision unit 46 compares the change in the selection result MIN[f(Gl), f(Gr)] from the comparison unit 36 with the type-decision threshold Thr4, and decides whether the collision type of the vehicle 10 is symmetric or asymmetric. However, the decision unit 46 does not substantially decide the collision type of the vehicle 10 after the arithmetic result f(Gm) with respect to the central portion reaches the prescribed value Ef2.

In addition to the above-described features, in accordance with the seventh embodiment, the decision unit 46 outputs the decision result of the collision type of the vehicle, which is based on the left and right decelerations before the arithmetic result f(Gm) reaches the prescribed value Ef2, after the arithmetic result f(Gm) reaches the prescribed value Ef2. More specifically, the decision unit 46 continually outputs a pseudo decision result signal indicating that the collision type is "undecided" until the arithmetic result f(Gm) reaches the prescribed value Ef2. After the arithmetic result f(Gm) reaches the prescribed value Ef2, the decision unit 46 compares the decision unit 46 with the selection result MIN[f(Gl), f(Gr)] obtained from the comparison unit 36 before the arithmetic result f(Gm) reaches the prescribed value Ef2, decides the collision, and outputs the true decision result.

Figure 15:
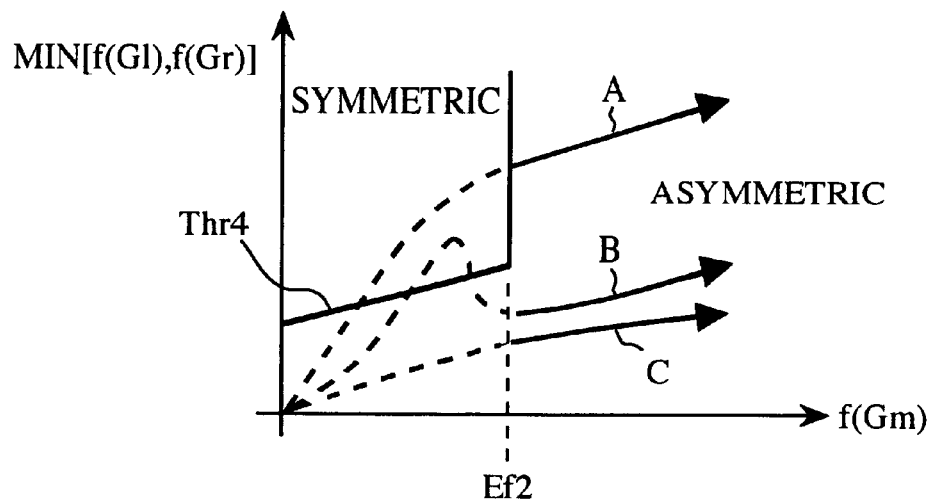
FIG. 15 is a graph showing a decision map used by a decision unit of a collision type decision device according to a seventh embodiment of the present invention.
Figure 16:
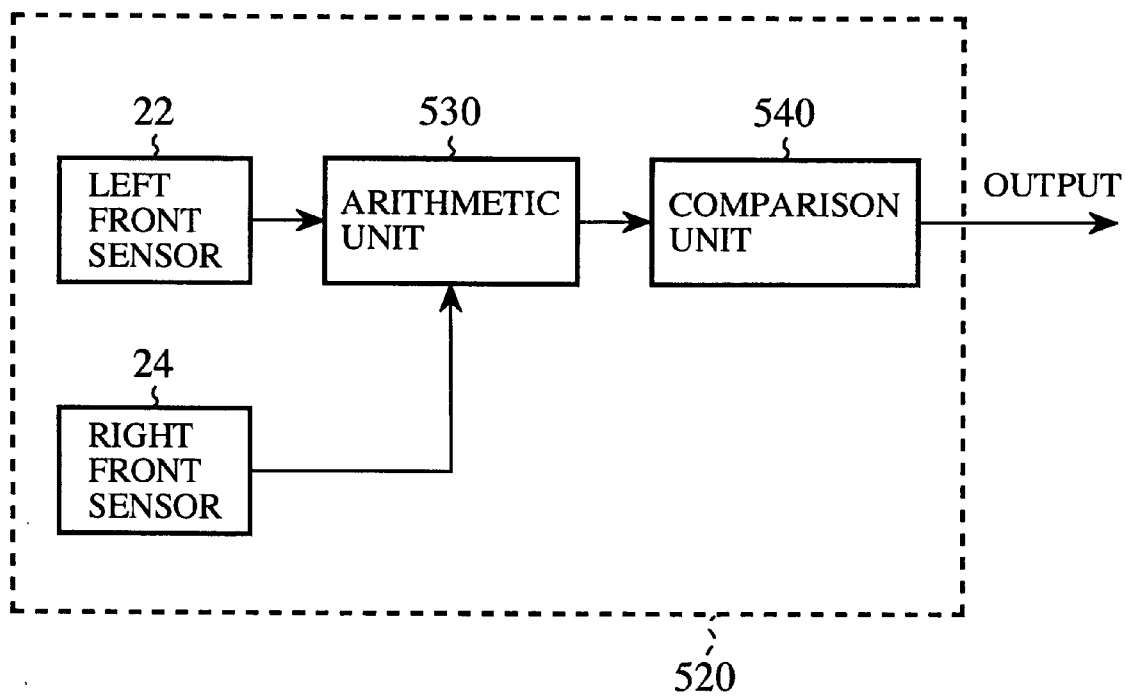
FIG. 16 is a block diagram showing a collision type decision device according to prior art.

For example, when the selection result MIN[f(Gl), f(Gr)] varies as denoted by curves A or B of the graph in FIG. 15, the selection result MIN[f(Gl), f(Gr)] becomes beyond the type-decision threshold Thr4 at least a certain period. In this case, the decision unit 46 decides that the collision type is symmetric after the arithmetic result f(Gm) arrives at the prescribed value Ef2, and outputs a signal indicating the decision result.

On the other hand, when the selection result MIN[f(Gl), f(Gr)] varies as denoted by curve C, the selection result MIN[f(Gl), f(Gr)] never exceed the type-decision threshold Thr4. In this case, the decision unit 46 decides that the collision type is asymmetric after the arithmetic result f(Gm) arrives at the prescribed value Ef2, and outputs a signal indicating the decision result.

The decision result signal from the decision unit 46 is used by the air bag ECU 30 (refer to FIG. 9) for controlling the activation of the air bag in the vehicle 10 as similar to the first embodiment.

Since the minimum deceleration or minimum velocity for activating the air bag for symmetric collision is different from that for asymmetric collision, the threshold for activating the air bag for symmetric collision is different from that for asymmetric collision. Therefore, the air bag ECU 30 sets the threshold for activating the air bag on the basis of the decision result by the decision unit 46. The threshold candidates for activating the air bag are stored, e.g., in a memory (not shown).

On the basis of the decision of collision type, the air bag ECU 30 selects the air-bag-activation threshold from the candidates in the memory, and compares the threshold with the deceleration or the velocity of the vehicle. If the deceleration or the velocity is higher than the air-bag-activation threshold, the air bag ECU 30 activates to inflate the air bag. In order to control the activation of the air bag, the air bag ECU 30 is preferably connected with the floor sensor 26 located in the driver/passenger's room of the vehicle 10 for notifying the air bag ECU 30 of the detected acceleration. Alternatively, the detection results from the acceleration sensors 22 and/or 24 may be used by the air bag ECU 30 to control the activation of the air bag.

In this embodiment, it is continually reported that the collision type is "undecided" at an initial collision stage until the arithmetic result f(Gm) reaches the prescribed value Ef2. Even at this stage, sometimes it may be necessary to activate and inflate the air bag. However, usually it is preferable that the air bag is not inflated unduly. Accordingly, while the collision type is reported to be "undecided," the air-bag-activation threshold is kept to be high by the air bag ECU 30. After the arithmetic result f(Gm) reaches the prescribed value Ef2, the air bag ECU 30 lowers the air-bag-activation threshold to a level that is suitable for either symmetric collision or asymmetric collision on the basis of the decision result by the decision unit 46.

As described above, by virtue of the seventh embodiment, it is possible to freely set an initial condition, such as the threshold for controlling the activation of a driver/passenger protection apparatus, at the initial stage after a collision, in addition to the advantages of the sixth embodiment.

In accordance with the spirit of the seventh embodiment, the first embodiment, the second embodiment, and the fourth embodiment may be also modified such that the decision result on the collision type of the vehicle may be output after the arithmetic result f(Gm) with respect to the portion near the central potion of the vehicle 10 reaches the prescribed value Ef2.

In a further modification, the decision result on the collision type of the vehicle may be output after the output Gm of the floor sensor 26, which is the deceleration of the portion near the central potion of the vehicle 10, reaches the prescribed value. In this case, the output Gm is directly supplied from the floor sensor 26 to the decision unit 46 as denoted by the dotted line in FIG. 12. It is intended that these modifications are encompassed in the scope of the present invention.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be encompassed in the scope of the claims.

What is claimed is:

1. A collision type decision device comprising:
    left and right deceleration detectors located at left and right front portions of a vehicle for detecting decelerations at the left and right front portions, respectively;
    an average calculating unit for calculating an average of values based on the decelerations detected by the left and right deceleration detectors; and
    a decision unit for comparing the average with a threshold and for deciding whether a collision type of the vehicle is a symmetric or asymmetric on the basis of the comparison.

2. The collision type decision device as recited in claim 1, further comprising an arithmetic unit for calculating the decelerations detected by the deceleration detectors to obtain arithmetic results with respect to the left and right portions of the vehicle, the average calculating unit calculating an average of the arithmetic results.

3. The collision type decision device as recited in claim 1, wherein the average calculating unit calculating an average of the decelerations themselves detected by the left and right deceleration detectors.

4. The collision type decision device as recited in claim 1, further comprising:
   a central deceleration detector located near the central portion of the vehicle for detecting deceleration at the central portion; and
   a collision beginning detector for detecting a collision beginning moment of the vehicle on the basis of the deceleration detected by the central deceleration detector or on the basis of the decelerations detected by the central deceleration detector and at least one of the left and right deceleration detectors, the decision unit outputting a decision result thereof for only a certain period after the collision beginning moment.

5. The collision type decision device as recited in claim 1, further comprising a central deceleration detector located near the central portion of the vehicle for detecting deceleration at the central portion,
   the decision unit comparing the threshold with a change in the average calculated by the average calculating unit for a period before a value based on the deceleration at the central portion reaches a certain level, deciding whether a collision type of the vehicle is a symmetric or asymmetric on the basis of the comparison, and outputting no decision on the collision type of the vehicle based on the left and right decelerations after the value based on the deceleration at the central portion reaches the certain level.

6. The collision type decision device as recited in claim 5, further comprising a second arithmetic unit for calculating the deceleration detected by the central deceleration detector to obtain an arithmetic result with respect to the central portion of the vehicle,
   the decision unit utilizes the arithmetic result with respect to the central portion as the value based on the deceleration at the central portion.

7. The collision type decision device as recited in claim 5, wherein the decision unit utilizes the deceleration itself detected by the central deceleration detector as the value based on the deceleration at the central portion.

8. The collision type decision device as recited in claim 5, wherein the decision unit outputs a decision result on the collision type of the vehicle, which is based on the left and right decelerations before the value based on the deceleration at the central portion reaches the certain level, after the value based on the deceleration at the central portion reaches the certain level.

9. A collision type decision device comprising:
   left and right deceleration detectors located at left and right front portions of a vehicle for detecting decelerations at the left and right front portions, respectively;
   a selecting unit for selecting a lower value among two values based on the decelerations detected by the left and right deceleration detectors; and
   a decision unit for comparing a selection result selected by the selecting unit with a threshold and for deciding whether a collision type of the vehicle is a symmetric or asymmetric on the basis of the comparison.

10. The collision type decision device as recited in claim 9, further comprising an arithmetic unit for calculating the decelerations detected by the deceleration detectors to obtain arithmetic results with respect to the left and right portions of the vehicle,
    the selecting unit selecting a lower arithmetic result among the arithmetic results.

11. The collision type decision device as recited in claim 9, wherein the selecting unit selecting a lower deceleration among the decelerations themselves detected by the deceleration detectors.

12. The collision type decision device as recited in claim 9, further comprising:
    a central deceleration detector located near the central portion of the vehicle for detecting deceleration at the central portion; and
    a collision beginning detector for detecting a collision beginning moment of the vehicle on the basis of the deceleration detected by the central deceleration detector or on the basis of the decelerations detected by the central deceleration detector and at least one of the left and right deceleration detectors, the decision unit outputting a decision result thereof for only a certain period after the collision beginning moment.

13. The collision type decision device as recited in claim 9, further comprising a central deceleration detector located near the central portion of the vehicle for detecting deceleration at the central portion,
    the decision unit comparing the threshold with a change in the selection result selected by the selecting unit for a period before a value based on the deceleration at the central portion reaches a certain level, deciding whether a collision type of the vehicle is a symmetric or asymmetric on the basis of the comparison, and outputting no decision on the collision type of the vehicle based on the left and right decelerations after the value based on the deceleration at the central portion reaches the certain level.

14. The collision type decision device as recited in claim 13, further comprising a second arithmetic unit for calculating the deceleration detected by the central deceleration detector to obtain an arithmetic result with respect to the central portion of the vehicle,
    the decision unit utilizes the arithmetic result with respect to the central portion as the value based on the deceleration at the central portion.

15. The collision type decision device as recited in claim 13, wherein the decision unit utilizes the deceleration itself detected by the central deceleration detector as the value based on the deceleration at the central portion.

16. The collision type decision device as recited in claim 13, wherein the decision unit outputs a decision result on the collision type of the vehicle, which is based on the left and right decelerations before the value based on the deceleration at the central portion reaches the certain level, after the value based on the deceleration at the central portion reaches the certain level.

* * * * *